United States Patent
Zhang et al.

(10) Patent No.: US 12,225,561 B2
(45) Date of Patent: Feb. 11, 2025

(54) COMMUNICATION METHOD, COMMUNICATION APPARATUS, AND SYSTEM

(71) Applicant: Huawei Technologies Co., Ltd., Shenzhen (CN)

(72) Inventors: Yunhao Zhang, Shanghai (CN); Juan Zheng, Beijing (CN); Zhe Luo, Shanghai (CN); Xiuqiang Xu, Shanghai (CN); Yan Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 17/809,665

(22) Filed: Jun. 29, 2022

(65) Prior Publication Data
US 2022/0330227 A1 Oct. 13, 2022

Related U.S. Application Data

(63) Continuation of application No. PCT/CN2019/130272, filed on Dec. 31, 2019.

(51) Int. Cl.
*H04W 72/51* (2023.01)
*H04W 72/0446* (2023.01)
(Continued)

(52) U.S. Cl.
CPC ....... *H04W 72/51* (2023.01); *H04W 72/0446* (2013.01); *H04W 72/0453* (2013.01); *H04W 72/23* (2023.01)

(58) Field of Classification Search
CPC ............. H04W 72/51; H04W 72/0446; H04W 72/0453; H04W 72/23; H04W 48/12;
(Continued)

(56) References Cited

U.S. PATENT DOCUMENTS

| 2019/0342911 | A1 | 11/2019 | Talarico et al. |
| 2020/0351934 | A1* | 11/2020 | Khoshnevisan .. H04W 72/1268 |
| 2022/0231789 | A1* | 7/2022 | Ying ...................... H04L 1/189 |

FOREIGN PATENT DOCUMENTS

| CN | 107659994 A | 2/2018 |
| CN | 107948988 A | 4/2018 |

(Continued)

OTHER PUBLICATIONS

Ericsson, "Outcome of offline discussion on 7.1.3.1.4 (DCI content) -part I", TSG-RAN WG1 #93, R1-1807702, May 21-25, 2018, 15 Pages, Busan, Korea.

(Continued)

*Primary Examiner* — Thai Nguyen
(74) *Attorney, Agent, or Firm* — Slater Matsil, LLP

(57) ABSTRACT

A network device sends downlink control information to a first terminal device. The downlink control information includes: time domain resource information, where the time domain resource is a time domain resource on which a first data channel is located; and frequency domain resource information, where the frequency domain resources are a frequency domain resource on which the first data channel is located and a frequency domain resource on which a second data channel is located. The second data channel is located on a time domain resource different from the time domain resource on which the first data channel is located. The first terminal device receives, on the determined time domain resource and frequency domain resource, a signal that is located on the first data channel and that is from the network device.

20 Claims, 14 Drawing Sheets

(51) Int. Cl.
*H04W 72/0453* (2023.01)
*H04W 72/23* (2023.01)

(58) Field of Classification Search
CPC ..... H04L 5/001; H04L 5/0044; H04L 5/0094; H04L 5/0053
See application file for complete search history.

(56) References Cited

FOREIGN PATENT DOCUMENTS

| | | |
|---|---|---|
| CN | 110266461 A | 9/2019 |
| EP | 3641393 A2 | 4/2020 |
| WO | 2018230965 A2 | 12/2018 |
| WO | 2019214708 A1 | 11/2019 |
| WO | 2019216727 A1 | 11/2019 |

OTHER PUBLICATIONS

3GPP TS 38.212 V15.7.0 (Sep. 2019), 3rd Generation Partnership Project; Technical Specification Group Radio Access Network; NR; Multiplexing and channel coding (Release 15), 101 pages.
3GPP TS 38.214 V15.7.0 (Sep. 2019), 3rd Generation Partnership Project; Technical Specification Group Radio Access Network; NR; Physical layer procedures for data (Release 15), 106 pages.

* cited by examiner

COMMUNICATION METHOD, COMMUNICATION APPARATUS, AND SYSTEM

CROSS-REFERENCE TO RELATED APPLICATIONS

This application is a continuation of International Application No. PCT/CN2019/130272, filed on Dec. 31, 2019, which is hereby incorporated by reference in its entirety.

TECHNICAL FIELD

This application relates to the field of wireless communication technologies, and in particular, to a communication method and a communication apparatus.

BACKGROUND

With development of communication technologies, service requirements become increasingly diversified. To better adapt to different types of service requirements, it is considered to introduce a terminal device of a type different from that of a terminal device that can be supported by an existing protocol, for example, a new radio-light (NR-light) terminal device. The NR-light terminal device has a lower bandwidth processing capability, and therefore occupies less bandwidth resources.

How to design a communication technical solution for the NR-light terminal device to make the NR-light terminal device compatible with the existing protocol as much as possible is a problem that needs to be resolved.

SUMMARY

This application provides a communication method, a communication apparatus, and a system, so that an NR-light terminal device can obtain a system information block (SIB), belonging to the NR-light terminal device, with low overheads. In addition, the technical solutions disclosed in embodiments of this application have good forward compatibility.

According to a first aspect, an embodiment of this application provides a communication method, including:

A network device sends downlink control information (DCI) to a first terminal device. The DCI includes: time domain resource information, where the time domain resource information is used to determine a time domain resource, and the time domain resource is a time domain resource on which a first data channel is located; and frequency domain resource information, where the frequency domain resource information is used to determine frequency domain resources, the frequency domain resources are a frequency domain resource on which the first data channel is located and a frequency domain resource on which a second data channel is located. The second data channel is located on a time domain resource different from the time domain resource on which the first data channel is located. The first terminal device receives, on the determined time domain resource and frequency domain resource, a signal that is located on the first data channel and that is from the network device. The first data channel is used by the first terminal device to communicate with the network device. The second data channel is used by a second terminal device to communicate with the network device.

The communication mentioned above may be uplink communication and/or downlink communication. For specific descriptions of the uplink communication and/or the downlink communication, refer to related content in a specific implementation of this application.

In a possible design, the time domain resource information includes: time domain offset information, where the time domain offset information is used to determine a time domain interval between a time unit in which the DCI is located and a first time unit, and the first time unit is a time unit in which the first data channel is located; time domain start position information, where the time domain start position information is used to determine a first position, and the first position is a time domain start position of the first data channel in the first time unit; and duration information, where the duration information is used to determine first duration, and the first duration is duration occupied by the first data channel in the first time unit.

In a possible design, the first position is further a time domain start position of the second data channel in a second time unit, and the second time unit is a time unit in which the second data channel is located. The first duration is further duration occupied by the second data channel in the second time unit.

In a possible design, the first data channel is located in a first bandwidth part (BWP), and the DCI and the second data channel are located in a second BWP. The DCI further includes BWP information, and the BWP information is used to determine the first BWP. The method further includes: The first terminal device receives, on the determined first BWP, the signal that is located on the first data channel and that is from the network device.

In the foregoing design, the first data channel is located in a BWP different from that in which the DCI and the second data channel are located. Because the first data channel of the first terminal device is located in a BWP different from the second BWP in which the second data channel of the second terminal device is located, the first terminal device and the second terminal device may complete remaining initial access processes and random access processes on different BWPs. This reduces a quantity of terminal devices that perform random access on a same BWP, to effectively reduce a collision probability of the random access on the same BWP. In addition, after the first terminal device is switched to the second BWP different from the first BWP, if the network device desires to page a terminal device that performs communication on the second BWP, the first terminal device does not receive an unnecessary paging message, so that paging is more targeted, to reduce overheads of an entire system.

In a possible design, the BWP information includes BWP offset information, or BWP offset information and first BWP bandwidth information, or first BWP start position information and first BWP bandwidth information.

The BWP offset information is used to determine a frequency domain interval between the second BWP and the first BWP, the first BWP bandwidth information is used to determine bandwidth occupied by the first BWP, and the first BWP start position information is used to determine a frequency domain start position of the first BWP.

This design reflects configuration flexibility of BWP information.

In a possible design, if the time domain resource information corresponds to 0 bits, the time domain resource is predefined. This design can minimize system overheads.

In a possible design, the first terminal device and the second terminal device are different types of terminal devices. For example, the first terminal device is an NR-light terminal device, and the second terminal is a common terminal device.

In a possible design, the signal on the first data channel includes a system message. The first data channel may be a physical downlink shared channel (PDSCH) carrying the system message.

In a possible design, the DCI further includes confirmation information, and the confirmation information is used to determine that the second data channel is located on the time domain resource different from the time domain resource on which the first data channel is located. This design is directly clear, and the first terminal device does not need to perform a large quantity of information processing and determining.

In a possible design, at least one of the following is located in a reserved domain of the DCI: the time domain offset information, the time domain start position information, the duration information, the BWP information, and the confirmation information. In this way, good forward compatibility is achieved.

According to the foregoing technical solution, at least a part of information of a common terminal device is reused, so that an NR-light terminal device can obtain a SIB, belonging to the NR-light terminal device, with low overheads. The method has good forward compatibility.

According to a second aspect, an embodiment of this application provides a communication method, including the following.

A network device sends DCI to a first terminal device on a second BWP. The DCI includes BWP information, the BWP information is used to determine a first BWP, and a first data channel is located in the first BWP. The first terminal device receives, on the determined first BWP, a signal that is located on the first data channel and that is from the network device.

In a possible design, the BWP information includes BWP offset information, or BWP offset information and first BWP bandwidth information, or first BWP start position information and first BWP bandwidth information.

The BWP offset information is used to determine a frequency domain interval between the second BWP and the first BWP, the first BWP bandwidth information is used to determine bandwidth occupied by the first BWP, and the first BWP start position information is used to determine a frequency domain start position of the first BWP.

This design reflects configuration flexibility of BWP information.

The first terminal device further needs to determine a specific time domain resource and frequency domain resource of the first data channel on the first BWP.

In a possible design, a manner of determining the specific time domain resource and frequency domain resource is a manner of determining the time domain resource and the frequency domain resource of the first data channel in the first aspect.

In a possible design, the first terminal device may reuse information in an existing frequency domain resource assignment field and time domain resource assignment field in the DCI, that is, determine a time frequency resource of a second data channel that is located in a same BWP, namely, the second BWP, as the DCI as a time frequency resource of the first data channel in the first BWP. The second data channel is used by the network device to communicate with a second terminal device.

Optionally, the first terminal device and the second terminal device are different types of terminal devices. For example, the first terminal device is an NR-light terminal device, and the second terminal is a common terminal device.

In this design, the frequency domain resource of the first data channel may be determined in the following several cases.

If bandwidth occupied by the first BWP is greater than bandwidth occupied by the second BWP, the first terminal device determines the frequency domain resource of the first data channel in the first BWP in a manner the same as that of determining a frequency domain resource of the second data channel in the second BWP.

If bandwidth occupied by the first BWP is less than bandwidth occupied by the second BWP, and a length of a frequency domain resource determined by using a frequency domain assignment field is greater than the bandwidth occupied by the first BWP, the first terminal device determines that the frequency domain resource of the first data channel is the bandwidth occupied by the first BWP.

If bandwidth occupied by the first BWP is less than bandwidth occupied by the second BWP, a length of a frequency domain resource determined by using a frequency domain assignment field is less than or equal to the bandwidth occupied by the first BWP, and a part of the frequency domain resource determined by using the frequency domain assignment field exceeds the bandwidth occupied by the first BWP, the first terminal device determines a start position of the frequency domain resource, determined by using the frequency domain assignment field, as a start position of the first BWP, and determines a length of the frequency domain resource is a length determined by using the frequency domain assignment field.

This design greatly improves forward compatibility.

In a possible design, the signal on the first data channel includes a system message. The first data channel may be a physical downlink shared channel carrying the system message.

In a possible design, the DCI further includes confirmation information, and the confirmation information is used to determine that the second data channel is located on a time domain resource different from a time domain resource on which the first data channel is located. This design is directly clear, and the first terminal device does not need to perform a large quantity of information processing and determining.

According to the foregoing technical solution, data channels of two different types of terminal devices are indicated by using same DCI, and forward compatibility is ensured. Further, the first data channel of the first terminal device is located in a BWP different from the second BWP in which the second data channel of the second terminal device is located. To be specific, the first terminal device and the second terminal device complete remaining initial access processes and random access processes on different BWPs. This reduces a quantity of terminal devices that perform random access on a same BWP, to effectively reduce a collision probability of random access on the same BWP. In addition, after the first terminal device is switched to the different second BWP, if the network device desires to page a terminal device that performs communication on the second BWP, the first terminal device does not receive an unnecessary paging message, so that paging is more targeted, to reduce overheads of an entire system.

According to a third aspect, an embodiment of this application provides a communication method, including the following.

A network device sends DCI to a first terminal device on a second BWP. The DCI includes first information, and the first information is used to determine a first BWP in which a first data channel is located and a time frequency resource of the first data channel in the first BWP. The first terminal device receives, on the determined first BWP, a signal that is located on the first data channel and that is from the network device. The second BWP is different from the first BWP.

Optionally, the first terminal device may determine the first BWP and the time frequency resource of the first data channel in the first BWP based on the DCI.

In a possible design, the signal is a system message.

Optionally, the first terminal device initiates a random access process to the network device based on the system message, and/or receives a paging signal from the network device.

In a possible design, the first information includes BWP information, time domain resource information, and frequency domain resource information. The time domain resource information may further include time domain offset information, time domain start position information, and duration information. In this embodiment, the foregoing information is indicated by using newly added fields.

In a possible design, the first information includes: BWP information, where the BWP information is used to determine the first BWP; time domain offset information, where the time domain offset information is used to determine a time domain interval between a time unit in which the DCI is located and a first time unit, and the first time unit is a time unit in which the first data channel is located; time domain start position information, where the time domain start position information is used to determine a first position, and the first position is a time domain start position of the first data channel in the first time unit; duration information, where the duration information is used to determine first duration, and the first duration is duration occupied by the first data channel in the first time unit; and frequency domain resource information, where the frequency domain resource information is used to determine a first frequency domain resource, and the first frequency domain resource is a resource unit in which the first data channel is located.

According to the foregoing technical solution, each parameter for determining a position of the first data channel is separately indicated by the network device. In this manner, the position of the first data channel is not limited, to improve system flexibility.

According to a fourth aspect, an embodiment of this application provides a communication method, including:

A network device sends downlink control information DCI to a first terminal device. The DCI is used to indicate a time frequency resource of a second data channel of a second terminal device and a first resource of the second data channel in a first time unit. The first terminal device receives, on a second resource in the first time unit, a signal on the first data channel of the first terminal. The second resource is a remaining part other than the first resource in the first time unit.

According to a fifth aspect, an embodiment of this application provides a communication method, including:

A network device sends downlink control information DCI to a first terminal device. The DCI includes: time domain resource information, where the time domain resource information is used to determine a first time domain resource, and the first time domain resource is a first time unit in which a first data channel is located; and frequency domain resource information, where the frequency domain resource information is used to determine first frequency domain resources, and the first frequency domain resources are a resource resource on which the first data channel is located and a resource resource on which a second data channel is located. The second data channel is located in the first time unit, and the frequency domain resource of the first data channel and the frequency domain resource of the second data channel do not overlap.

The first terminal device receives, on the determined first time domain resource and first frequency domain resource, a signal that is located on the first data channel and that is from the network device.

According to a sixth aspect, an embodiment of this application provides a communication method, including:

A network device sends downlink control information DCI to a first terminal device. The DCI includes: time domain resource information, where the frequency domain resource information is used to determine first frequency domain resources, and the first frequency domain resources are a frequency domain resource on which a first data channel is located and a frequency domain resource on which a second data channel is located; and time domain resource information, where the time domain resource information is used to determine a first time domain resource, and the first time domain resource is a time domain resource on which the first data channel is located. The second data channel and the first data channel are located in a same time unit, and the frequency domain resource of the first data channel and the time domain resource of the second data channel do not overlap. The first terminal device receives, on the determined first time domain resource and first frequency domain resource, a signal that is located on the first data channel and that is from the network device.

According to a seventh aspect, an embodiment of this application provides a communication method, including:

A network device sends downlink control information DCI to a first terminal device. The DCI includes: frequency domain resource information, where the frequency domain resource information is used to determine a first frequency domain resource, and the first frequency domain resource is a frequency domain resource on which a first data channel is located; and time domain resource information, where the time domain resource information is used to determine a first time domain resource, and the first time domain resource is a time domain resource on which the first data channel is located. A second data channel and the first data channel are located in a same time unit, and a time frequency resource of the first data channel and a time frequency domain resource of the second data channel do not overlap. The first terminal device receives, on the determined first time domain resource and first frequency domain resource, a signal that is located on the first data channel and that is from the network device.

In a possible design, the first data channel is used by the first terminal device to communicate with the network device, and the second data channel is used by a second terminal device to communicate with the network device.

In a possible design, the first terminal device and the second terminal device are different types of terminal devices. For example, the first terminal device is an NR-light terminal device, and the second terminal is a common terminal device.

In the methods provided in the fourth aspect to the seventh aspect, the first data channel and the second data channel are located in a same BWP, and the first data channel and the second data channel are also located in a same time unit. These methods ensure that communication between the first terminal device and the network device on the first data channel and communication between the second terminal device and the network device on the second data channel do not interfere with each other.

According to an eighth aspect, an embodiment of this application provides a communication apparatus. The communication apparatus may be the first terminal device mentioned above, or may be an apparatus (for example, a chip) located in the first terminal device. The communication apparatus may include a corresponding function module or circuit, configured to perform a method performed by the first terminal device in any one of the first aspect to the seventh aspect or the possible designs of the first aspect to the seventh aspect.

According to a ninth aspect, an embodiment of this application provides a communication apparatus. The communication apparatus may be the network device mentioned above, or may be an apparatus (for example, a chip) located in the network device. The communication apparatus may include a corresponding function module or circuit, configured to perform a method performed by the network device in any one of the first aspect to the seventh aspect or the possible designs of the first aspect to the seventh aspect.

According to a tenth aspect, an embodiment of this application provides a communication apparatus. The communication apparatus includes a processor, configured to implement a function of the first terminal device in any one of the first aspect to the seventh aspect or the possible designs of the first aspect to the seventh aspect. The communication apparatus may further include a memory, configured to store instructions and data. The memory is coupled to the processor. When the processor executes program instructions stored in the memory, the function of the first terminal device can be implemented. The communication apparatus may further include a communication interface. The communication interface is used by the communication apparatus to communicate with another device. For example, the communication interface may be a transceiver (including an antenna), a circuit, a bus, or another type of communication interface, and the another device may be a network device or the like.

According to an eleventh aspect, an embodiment of this application provides a communication apparatus. The communication apparatus includes a processor, configured to implement a function of the network device in any one of the first aspect to the seventh aspect or the possible designs of the first aspect to the seventh aspect. The communication apparatus may further include a memory, configured to store instructions and data. The memory is coupled to the processor. When the processor executes program instructions stored in the memory, the function of the network device can be implemented. The communication apparatus may further include a communication interface. The communication interface is used by the communication apparatus to communicate with another device. For example, the communication interface may be a transceiver (including an antenna), a circuit, a bus, or another type of communication interface, and the another device may be a terminal device or the like.

According to a twelfth aspect, an embodiment of this application further provides a computer-readable storage medium. The storage medium stores instructions. When the instructions are run, a function of the first terminal device in any one of the first aspect to the seventh aspect or the possible designs of the first aspect to the seventh aspect can be implemented.

According to a thirteenth aspect, an embodiment of this application further provides a computer-readable storage medium. The storage medium stores instructions. When the instructions are run, a function of the network device in any one of the first aspect to the seventh aspect or the possible designs of the first aspect to the seventh aspect can be implemented.

According to a fourteenth aspect, an embodiment of this application further provides a chip system. The chip system includes a processor including an integrated circuit and a memory, and is configured to implement a function of the first terminal device in any one of the first aspect to the seventh aspect or the possible designs of the first aspect to the seventh aspect. The chip system may include a chip, or may include a chip and another discrete component.

According to a fifteenth aspect, an embodiment of this application further provides a chip system. The chip system includes a processor including an integrated circuit and a memory, and is configured to implement a function of the network device in any one of the first aspect to the seventh aspect or the possible designs of the first aspect to the seventh aspect. The chip system may include a chip, or may include a chip and another discrete component.

According to a sixteenth aspect, an embodiment of this application further provides a computer program product, including instructions. When the instructions are run by a communication apparatus, the communication apparatus can implement a function of the first terminal device in any one of the first aspect to the seventh aspect or the possible designs of the first aspect to the seventh aspect.

According to a seventeenth aspect, an embodiment of this application further provides a computer program product, including instructions. When the instructions are run by a communication apparatus, a function of the network device in any one of the first aspect to the seventh aspect or the possible designs of the first aspect to the seventh aspect can be implemented.

According to an eighteenth aspect, an embodiment of this application further provides a communication system, including the communication apparatus according to the eighth aspect and the communication apparatus according to the ninth aspect. Alternatively, the communication system includes the communication apparatus according to the tenth aspect and the communication apparatus according to the eleventh aspect.

In addition, for technical effects brought by any one of the possible design manners in the eighth aspect to the eighteenth aspect, refer to technical effects brought by different design manners in the method parts. Details are not described herein again.

DETAILED DESCRIPTION OF ILLUSTRATIVE EMBODIMENTS

First, some descriptions in this application are explained as follows:

In embodiments of this application, "at least one" means one or more. "A plurality of" means two or more than two. "At least one of . . . " or a similar expression thereof refers to any combination of these items, including a single item (piece) or any combination of a plurality of items (pieces). For example, at least one of a, b, or c may represent a, b, c, a and b, a and c, b and c, or a, b and c. Each of a, b, and c may be an element, or may be a set including one or more elements. The term "and/or" describes an association relationship between associated objects, and indicates that three relationships may exist. For example, A and/or B may represent the following cases: Only A exists, both A and B exist, and only B exists. A and B may be singular or plural.

In this application, "example", "in some embodiments", "in some other embodiments", or the like is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In embodiments of this application, communication and transmission may be interchangeably used sometimes. It should be noted that meanings expressed by the terms are consistent when a difference is not emphasized. For example, transmission may include sending, receiving, or sending and receiving, and may be a noun or a verb.

Terms such as "first" and "second" in embodiments of this application are used for distinguishing description only, and cannot be understood as an indication or implication of relative significance or an indication or implication of order.

Figure 1:
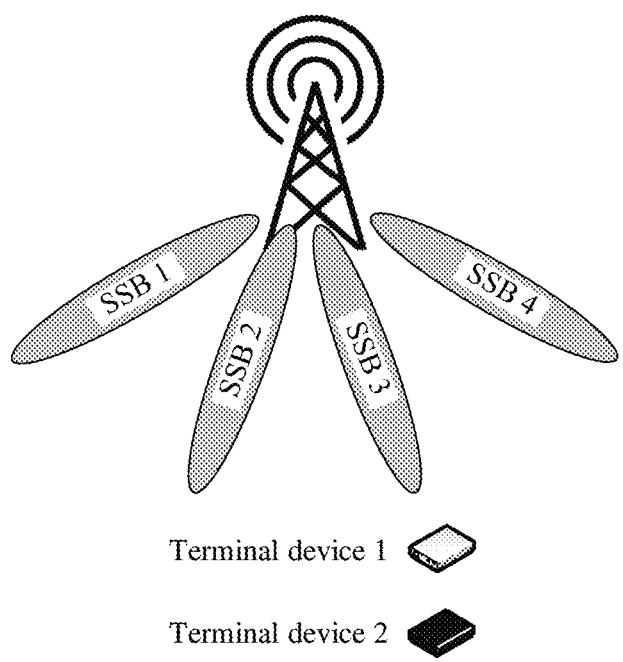
FIG. 1 is a schematic diagram of an architecture of a communication system according to an embodiment of this application.

FIG. 1 is a schematic diagram of an architecture of a communication system to which an embodiment of this application is applicable. As shown in FIG. 1, a terminal device 1 and a terminal device 2 may access one or more wireless networks by using a network device 10, and perform uplink communication and/or downlink communication with the wireless network by using the network device 10. The wireless network includes but is not limited to a long term evolution (LTE) system, an NR (new radio) system in a 5th generation (5G) mobile communication system, another existing or future mobile communication system, and the like.

Some terms in embodiments of this application are explained below, to facilitate understanding of the technical solutions disclosed in embodiments of this application.

1. Terminal device: In embodiments of this application, the terminal device is a device that has a wireless transceiver function, may be referred to as a terminal for short, and may be also referred to as user equipment (UE), a mobile station (MS), a mobile terminal (MT), a vehicle-mounted terminal device, a remote station, a remote terminal device, or the like. The terminal device may be fixed or movable. A specific form of the terminal device may be, for example, a mobile phone, a cellular phone, a cordless phone, a session initiation protocol (SIP) phone, a wearable device, a pad, a desktop personal computer, a notebook computer, a vehicle-mounted terminal, a wireless local loop (WLL) station, or a personal digital assistant (PDA). In addition to conventional voice, video, and digital communication, the terminal device may be further applied to the following scenarios: virtual reality (VR), augmented reality (AR), industrial control, self driving, remote medical surgery, a smart grid, transportation safety, a smart city, a smart home, and the like. It should be noted that the terminal device supports at least one wireless communication technology, for example, LTE, NR, or wideband code division multiple access (WCDMA).

The NR-light terminal device mentioned above in this specification may be also referred to as a reduced capability (REDCAP) terminal device, and may be a sensor, a wearable device, or the like. Compared with another terminal device, the NR-light terminal device has lower manufacturing costs, lower bandwidth for communicating with a network device, and lower power consumption.

2. Network device: In embodiments of this application, the network device is a device that provides a wireless communication function for a terminal device, and may be also referred to as a radio access network (RAN) device or the like. Specifically, the network device includes but is not limited to a next generation NodeB (gNB) in a 5G mobile communication system, an evolved NodeB (eNB) in an LTE system, a baseband unit (BBU), a transmitting and receiving point (TRP), a transmitting point (TP), a relay station, an access point, and the like. The network device may be alternatively a radio controller, a centralized unit (CU), a distributed unit (DU), or the like in a cloud radio access network (CRAN) scenario. The network device supports at least one wireless communication technology, for example, LTE, NR, or WCDMA.

3. Uplink communication: In embodiments of this application, the uplink communication may be also referred to as uplink transmission, and refers to a process in which a terminal device sends a signal to a network device in communication between the terminal device and the network device. The signal sent by the terminal device to the network device may be referred to as an uplink signal or uplink information. For example, the uplink signal includes uplink control information (UCI) and uplink data. The uplink control information is used to carry related information fed back by the terminal device, for example, channel state information (CSI) and an acknowledgement (ACK) or a negative acknowledgement (NACK). Specifically, the uplink control information may be carried on a physical uplink control channel (PUCCH), or may be carried on a physical uplink shared channel (PUSCH). The uplink data may be carried on a PUSCH.

4. Downlink communication: In embodiments of this application, the downlink communication may be also referred to as downlink transmission, and refers to a process in which a terminal device receives a signal, sent by a network device, in communication between the terminal device and the network device. The signal sent by the network device and received by the terminal device may be referred to as a downlink signal or downlink information. For example, the downlink signal may include downlink control information (DCI) and downlink data. The downlink control information is related information used to schedule the downlink data, for example, information, for example, resource assignment of a data channel and a modulation and coding scheme. Specifically, the DCI may be carried on a PDCCH, and the downlink data may be carried on a physical downlink shared channel (PDSCH).

Uplink data communication and/or downlink data communication may be also referred to as communication or data communication.

5. Carrier bandwidth part: In embodiments of this application, the carrier bandwidth part may be referred to as a bandwidth part (BWP) for short, and is a segment of contiguous or non-contiguous frequency domain resource on a carrier. Bandwidth of the segment of contiguous or non-contiguous frequency domain resource does not exceed a bandwidth capability of a terminal device, that is, bandwidth of the BWP is less than or equal to maximum bandwidth supported by the terminal device. For example, the BWP is a segment of contiguous frequency domain resource on the carrier. The BWP may be a group of contiguous resource blocks (RBs) on the carrier, or the BWP is a group of contiguous subcarriers on the carrier, or the BWP is a group of contiguous resource block groups (RBGs) on the carrier, or the like. One RBG includes one or more RBs, for example, one, two, four, eight, or 16 RBs. One RB may include one or more subcarriers, for example, 12 subcarriers.

Figure 2A:
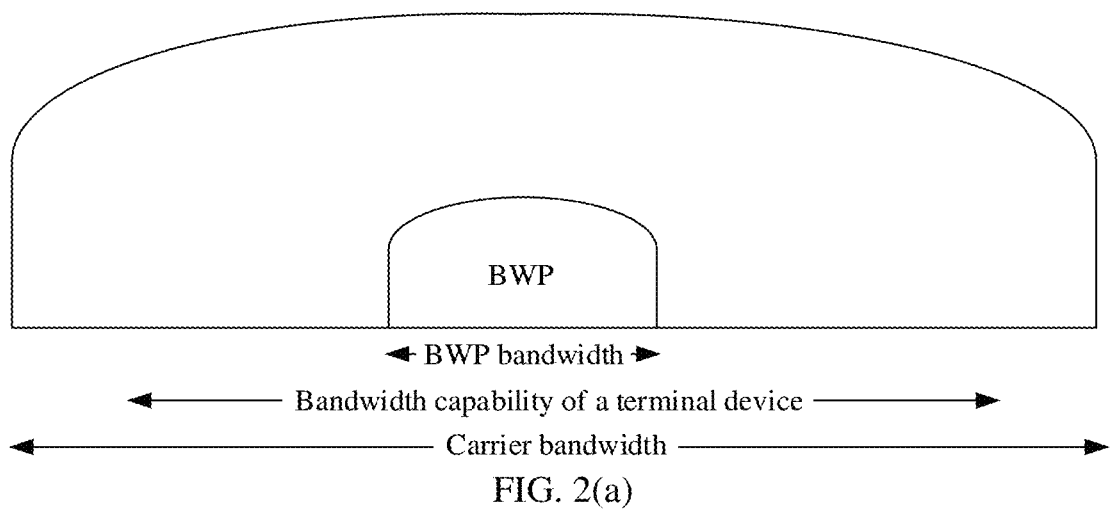
FIG. 2(a) to FIG. 2(c) are schematic diagrams of a relationship between a bandwidth part and a carrier bandwidth according to an embodiment of this application.
Figure 2B:
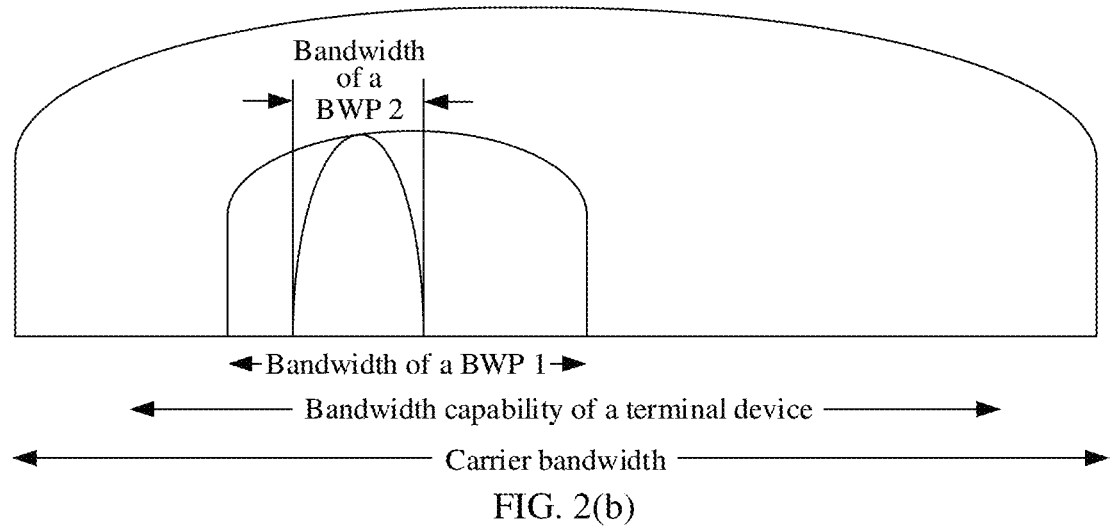
Figure 2C:
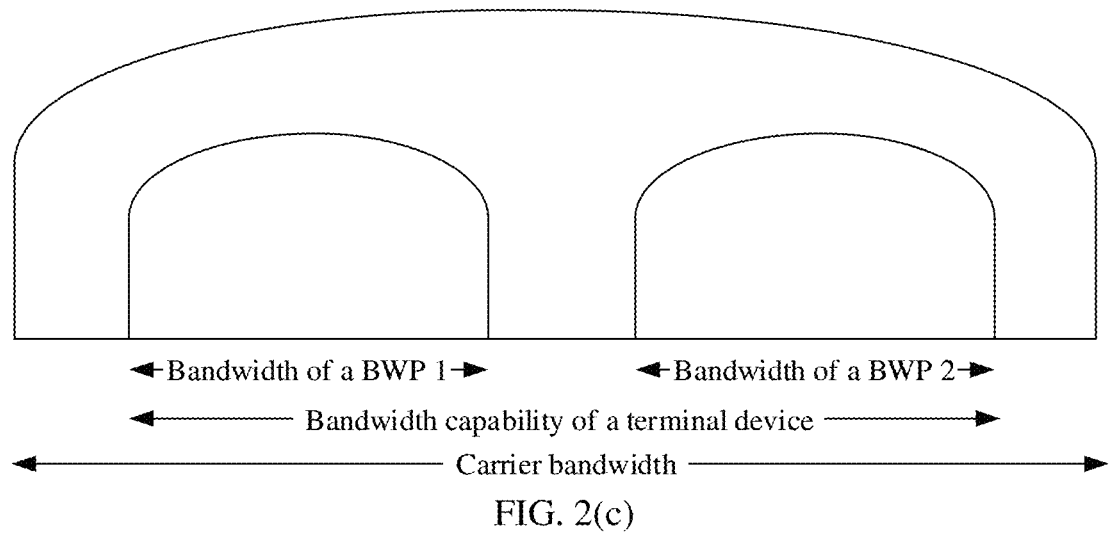

In embodiments of this application, a BWP used for communication between a terminal device and a network device may be configured by the network device, or may be predefined in a protocol. The protocol may be the 3rd Generation Partnership Project (3GPP). For one terminal device, the network device may configure one or more BWPs on one carrier for the terminal device. For example, as shown in FIG. 2(a), the network device configures one BWP on one carrier for the terminal device. Bandwidth of the BWP does not exceed a bandwidth capability of the terminal device, and the bandwidth of the BWP is not greater than bandwidth of the carrier. For another example, as shown in FIG. 2(b), the network device configures two BWPs on one carrier for the terminal device: a BWP 1 and a BWP 2, where the BWP 1 and the BWP 2 overlap. For another example, as shown in FIG. 2(c), the network device configures two BWPs on one carrier for the terminal device: a BWP 1 and a BWP 2, where the BWP 1 and the BWP 2 do not overlap. It should be noted that, in this embodiment of this application, a quantity of BWPs configured by the network device for the terminal device is limited. For example, the network device may configure a maximum of four BWPs for the terminal device.

In addition, the network device may configure system parameters for the terminal device for each BWP. In this embodiment of this application, system parameters corresponding to different BWPs may be the same or different.

6. Time frequency resource: In embodiments of this application, the time frequency resource may include a frequency domain resource and a time domain resource, and is a carrier for signal transmission. The frequency domain resource may be in a unit of a frequency domain unit. For example, the frequency domain unit is the foregoing RB. The time domain resource may be in a unit of a time unit.

7. Time unit: In embodiments of this application, the time unit may be a period of time on a time domain resource. For example, in time domain, a terminal device and a network device communicate with each other by using the time unit as a basic unit. For example, the time unit may be a radio frame, a subframe, a slot, a micro-slot, a mini-slot, or a symbol. This is not limited.

8. Slot: As a time unit, duration of one slot may be related to a size of a subcarrier spacing, and pieces of duration of slots corresponding to subcarrier spacings of different sizes are different. For example, when a subcarrier spacing is 15 kHz, duration of one slot may be 1 millisecond (ms), or when a subcarrier spacing is 30 kHz, duration of one slot may be 0.5 ms. For example, in this embodiment of this application, one slot may include one or more symbols. For example, with a normal cyclic prefix (CP), one slot may include 14 symbols, or with an extended CP, one slot may include 12 symbols.

As shown in FIG. 1, the network device 10 broadcasts one or more synchronization signal blocks (SSBs), for example, an SSB 1, an SSB 2, . . . , and an SSB 4, to terminal devices (1, 2, . . . ) through beam sweeping, so that the terminal device finds an appropriate SSB to complete an initial access process.

An objective of initial access is to enable the terminal device to obtain downlink synchronization with the network device and obtain system information of a cell in which the terminal device is located. The following briefly describes an initial access process of the terminal device 1 with reference to FIG. 3 by using the terminal device 1 in FIG. 1 as an example.

The terminal device 1 searches for and obtains an SSB, and the SSB may be one of the SSB 1, the SSB 2, . . . , and the SSB 4 in FIG. 1. For example, the terminal device 1 may select and obtain, based on received SSB quality, an SSB with best signal quality from SSBs that can be received.

Figure 3:
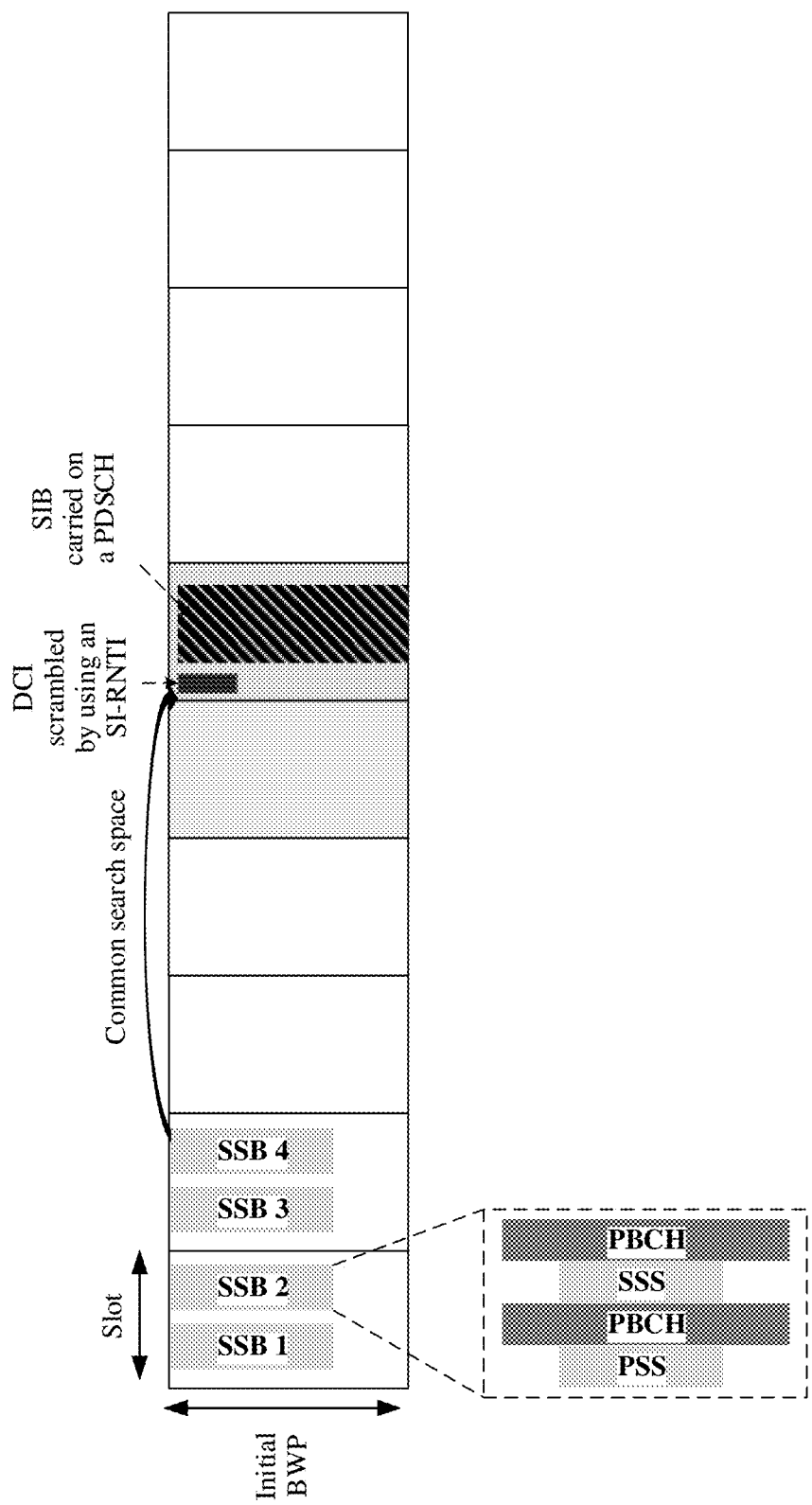
FIG. 3 is a schematic diagram of an access process of a terminal device according to an embodiment of this application.

The SSB includes a primary synchronization signal (primary synchronization signal, PSS), a secondary synchronization signal (SSS), and a physical broadcast channel (PBCH) signal. When the terminal device 1 obtains the SSB, that is, obtains the PSS and the SSS in the SSB, it may be considered that the terminal device 1 obtains the downlink synchronization with the network device. The terminal device 1 may further read a master information block (MIB) from the PBCH signal. The MIB includes control channel configuration information pdcch-config, and the terminal device determines common search space (CSS) 0 and a control resource set (CORESET) 0 by using pdcch-config. The CSS 0 is used to determine a time domain start position for blindly detecting downlink control information (DCI) located on a physical downlink control channel (PDCCH) in the initial access process. The CORESET 0 is used to determine a length of a frequency domain resource and a length of a time domain resource that are used for blindly detecting the DCI located on the PDCCH in the initial access process. For example, as shown in FIG. 3, a time unit to which a solid-line arrow points is the CSS 0 and the CORESET 0 that are determined by using the SSB. The terminal device 1 obtains, through blind detection in the CSS 0 and the CORESET 0, DCI scrambled by using a system information-radio network temporary identifier (SI-RNTI). The DCI scrambled by using the SI-RNTI indicates that a function of the DCI is to schedule a system information block (SIB). Finally, the terminal device 1 obtains, according to an indication of the DCI, a SIB (for example, a SIB1) of a cell in which the terminal device 1 is located.

Further, the DCI scrambled by using the SI-RNTI may include fields and a quantity of bits of each field shown in the following Table 1.

TABLE 1

| Field | Quantity of bits |
|---|---|
| Frequency domain resource assignment | 9 |
| Time domain resource assignment | 4 |
| Virtual resource block (VRB) to physical resource block (PRB) mapping (VRB-to-PRB mapping) | 1 |
| Modulation and coding scheme | 5 |
| Redundancy version | 2 |
| System information indicator | 1 |
| Reserved bits | 15 |

The frequency domain resource assignment is used to indicate a frequency domain position of a data channel, for example, a physical downlink shared channel (PDSCH), scheduled by the DCI scrambled by using the SI-RNTI. A frequency domain resource indication manner includes a type 0 and a type 1. The type 0 is non-contiguous frequency domain resource assignment, and the type 1 is contiguous frequency domain resource assignment. Currently, the DCI scrambled by using the SI-RNTI supports frequency domain resource assignment of the type 1, and the frequency domain resource assignment of the type 1 determines a start position and a length of a frequency domain resource of the data channel by using a resource indication value (RIV). To be specific, a value of the RIV is provided by a frequency domain resource assignment field. The start position $RB_{start}$ and the length $L_{RBs}$ of the frequency domain resource of the data channel may be obtained through calculation by using the following formula (1):

When $(L_{RBs}-1) \leq \lfloor N/2 \rfloor$, $RIV = N*(L_{RBs}-1) + RB_{start}$.

When $(L_{RBs}-1) > \lfloor N/2 \rfloor$, $RIV = N*(N-L_{RBs}+1) + (N-1-RB_{start})$      formula (1).

N is a quantity of physical resource blocks RBs included in a BWP. The frequency domain resource of the data channel scheduled by the DCI may be obtained by using $RB_{start}$ and $L_{RBs}$.

The time domain resource assignment is used to indicate a time domain resource of the data channel scheduled by the DCI scrambled by using the SI-RNTI. A row in a predefined table is indicated mainly by using a time domain resource assignment field, to obtain the time domain resource of the data channel scheduled by the DCI. The time domain resource assignment field may be a row index (row index). In the following Table 2, one row index may correspond to a plurality of demodulation reference signal (DMRS) positions (where the DMRS positions may be carried in an MIB message and notified to a terminal device). The row index and the DMRS positions may jointly determine a PDSCH mapping type (Type A or Type B), indicate a slot (slot) offset value K0, namely, a time domain offset value of a slot in which the DCI is located and a slot in which the data channel scheduled by the DCI is located, indicate an index value S of a start symbol in the slot, and indicate a quantity L of occupied symbols, namely, duration.

TABLE 2

| Row index | (DMRS position) | PDSCH mapping type | K0 | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

According to Table 2, for example, a value (namely, the row index) of the time domain resource assignment field is 1. If a DMRS position is 2, it may be obtained, by querying Table 2, that K0=0, S=2, and L=12, that is, the time domain position of the data channel scheduled by the DCI is the third to the fourteenth symbols of the slot in which the DCI is located. In addition, it can be learned from Table 2 that in the conventional technology, values of K0 are all 0, that is, the DCI and the data channel scheduled by the DCI are in a same slot.

As described above, to better adapt to different types of service requirements, it is considered to introduce a terminal device of a type different from that of an existing terminal device in the conventional technology, for example, the NR-light terminal device mentioned above. If this type of terminal device is introduced, the schematic diagram of the architecture of the system shown in FIG. 1 may be updated to FIG. 4. Compared with that in FIG. 1, a terminal device 3 is added in FIG. 4. The terminal devices 1 and 2 are common terminal devices, and the terminal device 3 is an NR-light terminal device.

It should be noted that the NR-light terminal device and the common terminal devices in this embodiment of this application are merely used to represent two different types of terminal devices, to facilitate description and understanding of the technical solutions of this application. This embodiment of this application may be applied to another type of terminal device.

In the foregoing initial access process, the time frequency resource of the data channel indicated by the DCI scrambled by using the SI-RNTI can be used only by a common terminal device to obtain a SIB belonging to the common terminal device, and a SIB belonging to the NR-light terminal device is located on a data channel different from that of the common terminal device. How the NR-light terminal device obtains the SIB belonging to the NR-light terminal device is an urgent problem to be resolved.

It should be noted that scenarios in the following Embodiment 1 to Embodiment 5 are similar. Features, properties, examples, and the like of a first terminal device, a first data channel, a second terminal device, a second data channel, a first time unit, a second time unit, and a signal located on the first data channel are also the same as those in Embodiment 1. Definitions of various parameters, for example, RIV, RIV', K0, K0', F, S, S', S", L, L' and L", and information about various names are the same in various embodiments unless otherwise specified. Therefore, if a description has been provided in an embodiment, details are not described in other embodiments. Particularly, in Embodiment 6, except specially described terms and parameters, other terms and parameters are the same as or similar to those in other embodiments.

Embodiment 1

When an existing mechanism is reused as much as possible, to enable an NR-light terminal device to obtain a SIB belonging to the NR-light terminal device, an embodiment of this application provides a communication method. At least a part of information about a common terminal device is reused, so that the NR-light terminal device can obtain the SIB, belonging to the NR-light terminal device, with low overheads. This method has good backward compatibility.

Figure 4:
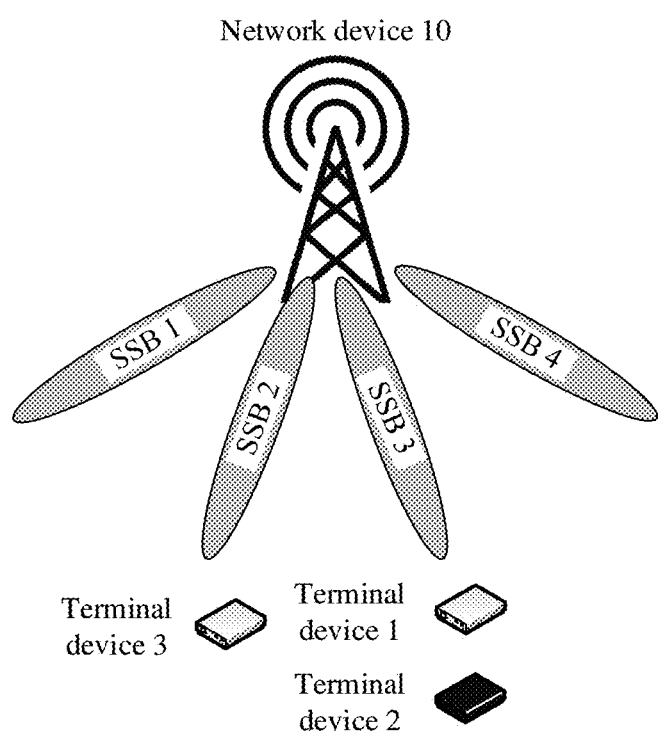
FIG. 4 is a schematic diagram of an architecture of another communication system according to an embodiment of this application.

The following describes in detail the communication method in Embodiment 1 of this application by using a schematic diagram of an architecture of a system shown in FIG. 4 as an example.

Figure 5:
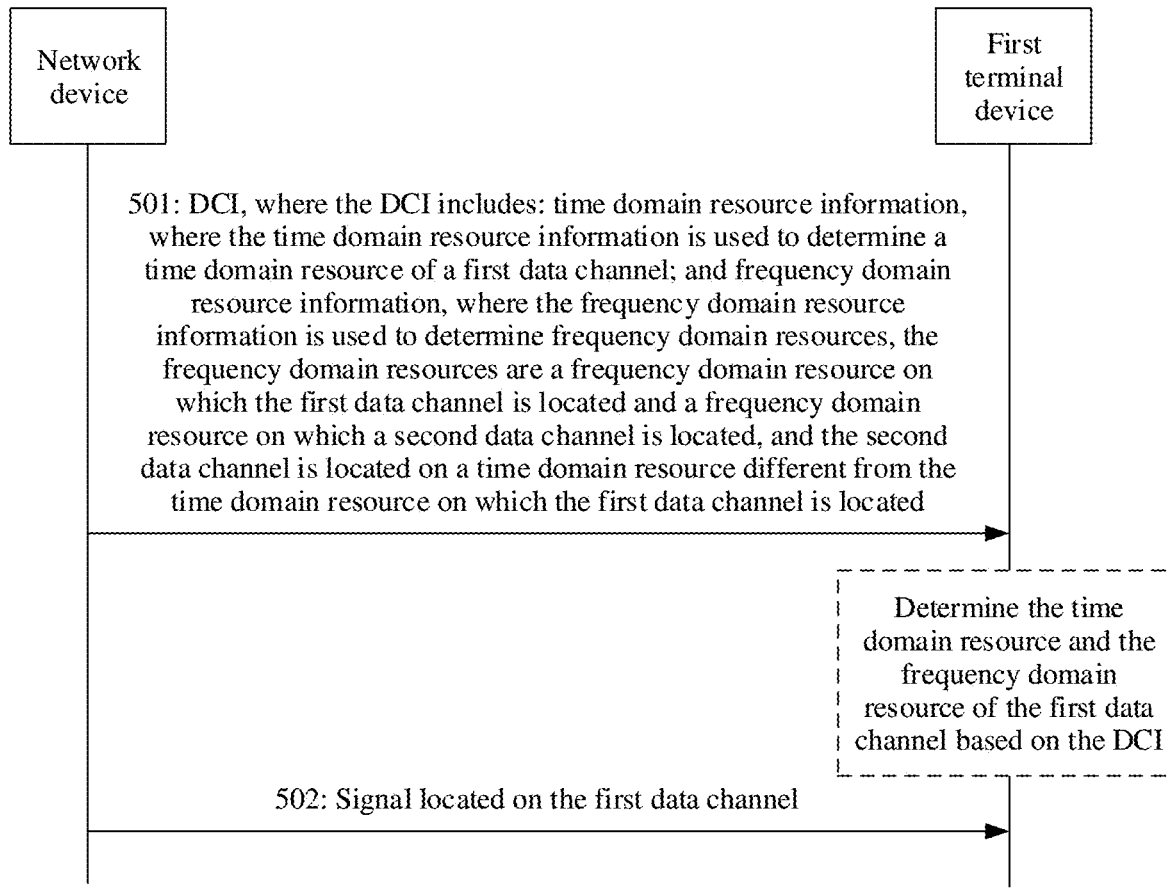
FIG. 5 is a schematic diagram of a communication method according to Embodiment 1 of this application.

For example, FIG. 5 is a schematic diagram of the communication method according to Embodiment 1 of this application. The communication method specifically includes the following steps.

Step 501: A network device sends DCI to a first terminal device. The DCI includes: time domain resource information, where the time domain resource information is used to determine a time domain resource, and the time domain resource is a time domain resource on which a first data channel is located; and frequency domain resource information, where the frequency domain resource information is used to determine frequency domain resources, the frequency domain resources are a frequency domain resource on which the first data channel is located and a frequency domain resource on which a second data channel is located. The second data channel is located on a time domain resource different from the time domain resource on which the first data channel is located.

Correspondingly, the first terminal device receives the DCI, and determines the time domain resource and the frequency domain resource of the first data channel based on the DCI.

Step 502: The first terminal device receives, on the determined time domain resource and frequency domain resource, a signal that is located on the first data channel and that is from the network device.

The first terminal device mentioned in the foregoing steps may be the terminal device 3 in FIG. 4, that is, may be an NR-light terminal device. The foregoing steps may be performed in a process in which the first terminal device performs initial access to obtain a SIB. In this case, the first data channel may be a PDSCH carrying the SIB, and the signal located on the first data channel is the SIB.

To obtain the SIB, the first terminal device needs to determine the time domain resource and the frequency domain resource of the first data channel, to receive the SIB on the determined time frequency resource, so as to complete the initial access. The DCI sent by the network device to the first terminal in Step 501 may provide the time domain resource information for determining the time domain resource of the first data channel and the frequency domain resource information for determining the frequency domain resource of the first data channel. In other words, the first terminal device may determine the time domain resource and the frequency domain resource of the first data channel based on the DCI received in Step 501. Particularly, the frequency domain resources determined based on the frequency domain resource information are not only the frequency domain resource on which the first data channel is located, but also the frequency domain resource on which another data channel, namely, the second data channel, is located. It should be further noted herein that the second data channel may be also a PDSCH carrying a SIB. However, the first data channel is used by the first terminal device to communicate with the network device, and the second data channel is used by another terminal device, namely, a second terminal device, to communicate with the network device. To be specific, the SIB that needs to be obtained by the first terminal device is located on the first data channel, and the SIB that needs to be obtained by the second terminal device is located on the second data channel. Herein, the first terminal device and the second terminal device may be different types of terminal devices. For example, the first terminal device is an NR-light terminal device, and the second terminal device is a common terminal device. The second data channel may be indicated by using a field that already exists in the DCI. It can be learned from the foregoing that the frequency domain resource information of the second terminal device is reused in the frequency domain resource information used to indicate the frequency domain resource of the first data channel.

Optionally, the frequency domain resource information is information in an existing frequency domain resource assignment field in Table 1.

In an implementation, the time domain resource information specifically includes the following information:

(1) Time domain offset information that may be represented by a time domain offset value K0'. The first terminal device may determine, based on K0', a time domain interval between a time unit in which the DCI is located and a first time unit. When K0'=0, the first time unit is a time unit in which the first data channel is located. When K0' is greater than 0, the time unit in which the DCI is located is different from the first time unit.

(2) Time domain start position information that may be represented by a time domain start symbol index value S'. The first terminal device may determine a first position based on S', the first position is a time domain start position of the first data channel in the first time unit, and S' is an integer greater than or equal to 0.

(3) Duration information that may be represented by a quantity L' of occupied symbols. The first terminal may determine first duration based on L', the first duration is duration occupied by the first data channel in the first time unit, and L' is an integer greater than or equal to 0.

Optionally, K0', S', and L' may be independent of information in a time domain resource assignment field in the existing Table 1, and may be information in a newly added field. For example, the newly added field is located in a reserved bit field in Table 1. Only the first terminal device can read K0', S', and L'. If the second terminal device of a type different from that of the first terminal device also receives the DCI, the second terminal device does not read information in the reserved bit field, that is, cannot obtain K0', S', and L'.

In an example, the first terminal device and the network device may pre-agree on a new table, and some or all content in the new table is the same as that in Table 2. For example, Table 3 is as follows.

TABLE 3

| Row index | K0' | S' | L' |
|---|---|---|---|
| 1 | 1 | 2 | 12 |
| 2 | 2 | 3 | 11 |
| 3 | 3 | 2 | 10 |
| 4 | 4 | 3 | 9 |
| 5 | 1 | 2 | 9 |
| 6 | 2 | 3 | 8 |
| 7 | 3 | 2 | 7 |
| 8 | 4 | 3 | 6 |
| 9 | 1 | 2 | 5 |
| 10 | 2 | 3 | 4 |
| 11 | 3 | 9 | 4 |
| 12 | 4 | 10 | 4 |
| 13 | 1 | 4 | 4 |
| 14 | 2 | 6 | 4 |
| 15 | 3 | 5 | 7 |
| 16 | 4 | 5 | 2 |

Figure 6:
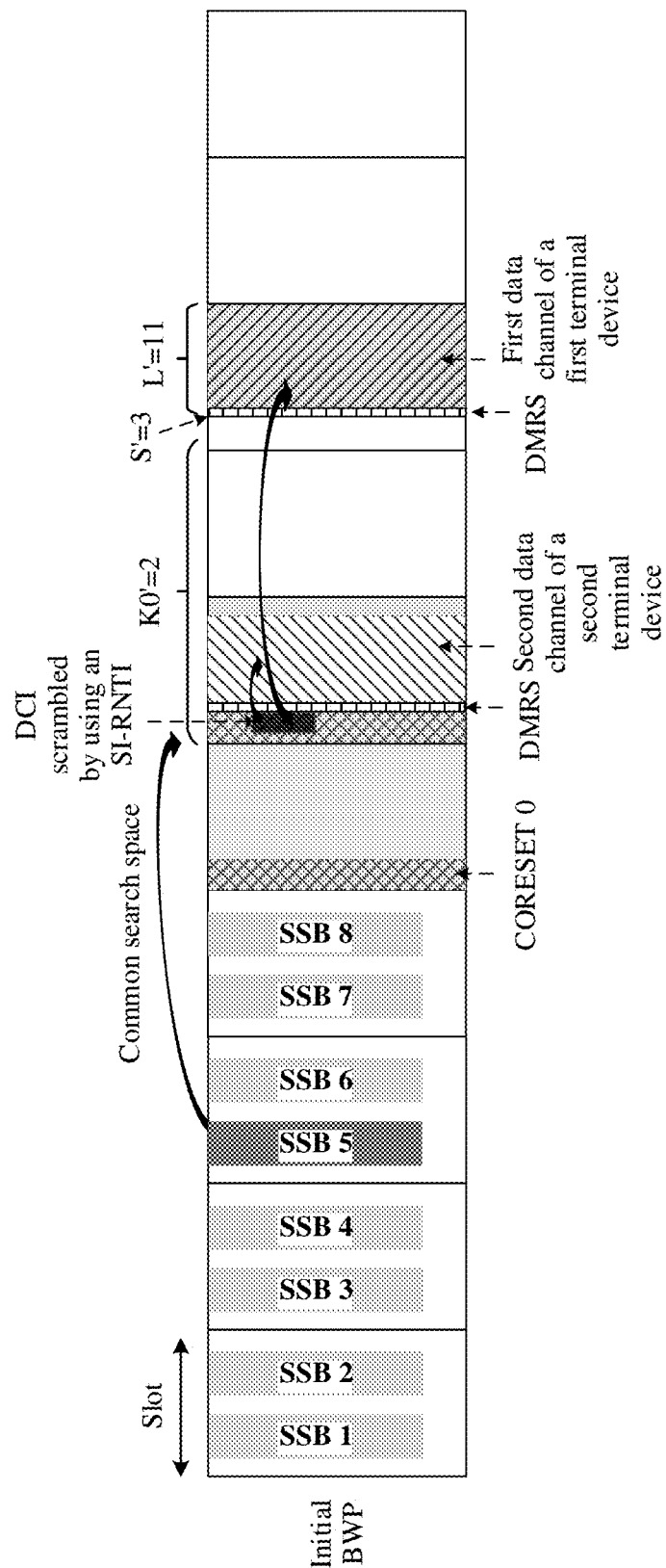
FIG. 6 is a schematic diagram of an indication manner of a data channel according to an embodiment of this application.

The table includes at least the row index and K0', S', and L' that correspond to the row index. In this case, the time domain resource information may be A bits located in the reserved bit field of the DCI, and the A bits may correspond to one row index (where A represents an integer). The first terminal device may obtain K0', S', and L' by querying Table 3. In this way, the first terminal device may determine the first time unit in which the first data channel is located and a specific position of the first data channel in the first time unit. Refer to FIG. 6. For example, it is assumed that the time unit is specifically a slot. The first terminal device may read the DCI in the manner described at the beginning of Embodiment 1, and the reserved field (for example, 15 bits) in the DCI includes the A bits corresponding to the row index. If that K0'=2, S'=3, and L'=11 is obtained through querying Table 3 by using a row index value 2 corresponding to the A bits, the first data channel is located on the fourth to the fourteenth symbols in a second slot after a slot in which the DCI is located.

Optionally, a specific position of a demodulation reference signal DMRS of the first data channel in the first time unit may be the same as a specific position of a DMRS of the second data channel in a second time unit by default. In an implementation, similar to that in Table 2, a column may be further added to the new table, for example, Table 3, to indicate a DMRS position. For example, each row index in the table may correspond to at least a specific position of one DMRS in the second time unit. Particularly, the second terminal device is a common terminal device. As described above, the time domain resource assignment in the DCI determines that K0 corresponding to the time domain resource of the second data channel is equal to 0, and K0' is greater than 0. It is indicated that the first data channel and the second data channel are located in different time units (for example, located in different slots). To be specific, the first data channel and the second data channel each may have sufficient time domain resources to carry a signal. In addition, because the first data channel and a PDCCH carrying the DCI are not located in a same time unit, the first data channel can occupy more time domain resources. To be specific, a signal carried on the first data channel may have a larger amount of information.

Optionally, K0' may be independent of the information in the time domain resource assignment field in the existing Table 1, and S' and L' reuse S and L obtained from the time domain resource assignment field in the existing Table 1, that is, S'=S, and L'=L. In other words, the first position is further a time domain start position of a second time unit in which the second data channel is located, the first duration is further duration occupied by a second time unit in which the second data channel is located. The second time unit is the time unit in which the second data channel is located. In this case, the frequency domain resource information for determining the frequency domain resource of the first data channel reuses the frequency domain resource information of the second terminal device, a part of the time domain resource information for determining the time domain resource of the first data channel also reuses a part of time domain resource information of the second terminal device. This further reduces DCI signaling overheads. In this scenario, only K0' is new information located in the reserved bit field. Similarly, only the first terminal device can read K0', and the second terminal device of the type different from that of the first terminal device cannot read K0'. In an example, B bits in the reserved bit field is used to indicate K0' (where B is an integer), and the first terminal device may determine, by using K0', the first time unit in which the first data channel is located. For example, the B bits is two bits (that is, B=2), and correspondingly indicates four pieces of possible K0': 1, 2, 3, and 4. Certainly, the four pieces of possible K0' may be alternatively determined in a manner pre-agreed on by the first terminal device and the network device or agreed on in a protocol.

Optionally, when a value of the A bits or the B bits is 0, or the A bits or the B bits defaults, a time domain resource that may be pre-agreed on by the first terminal device and the network device may be used as the time domain resource of the first data channel. In this way, system overheads can be minimized.

Embodiment 2

It should be noted that the technical solution in Embodiment 1 is implemented on a basis that the first data channel is located in a same BWP as the DCI and the second data channel by default. Actually, the first data channel may be alternatively located in a BWP different from that in which the DCI and the second data channel are located. To be specific, in this case, the first data channel is located in a first BWP, and the DCI and the second data channel are located in a second BWP. Embodiment 2 of this application provides another communication method for this case, so that data channels of two different types of terminal devices are indicated by using same DCI, to ensure forward compatibility. Further, a first data channel of a first terminal device is located in a BWP different from a second BWP in which a second data channel of a second terminal device is located, that is, the first terminal device and the second terminal device complete remaining initial access processes and random access processes on different BWPs. This reduces a quantity of terminal devices that perform random access on a same BWP, to effectively reduce a collision probability of random access on the same BWP. In addition, after the first terminal device is switched to the different second BWP, if a network device desires to page a terminal device that performs communication on the second BWP, the first terminal device does not receive an unnecessary paging message, so that paging is more targeted, to reduce overheads of an entire system.

Figure 7:
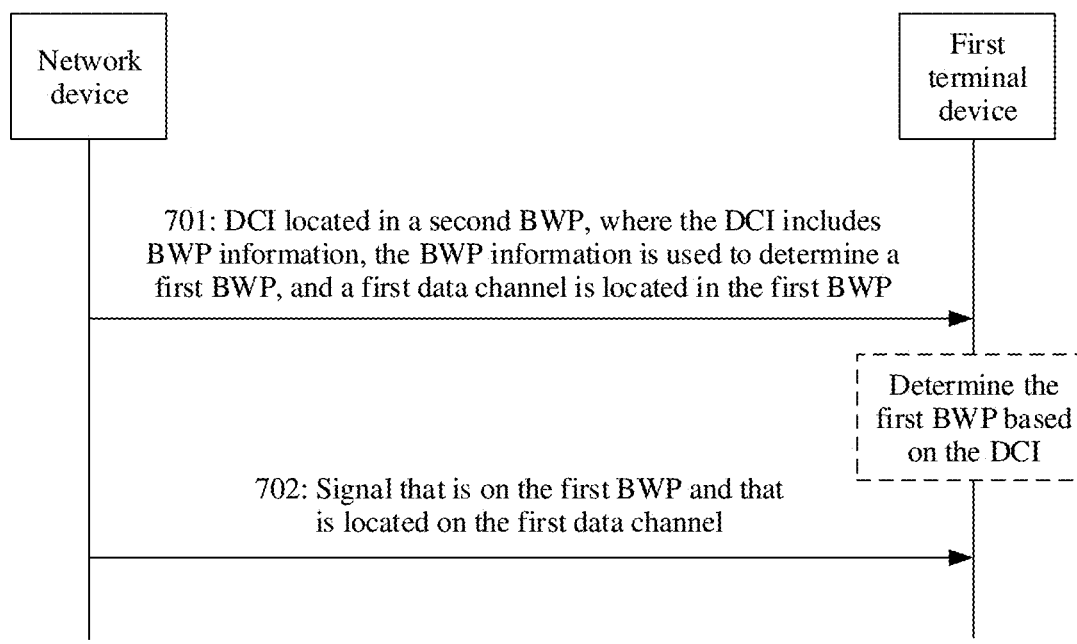
FIG. 7 is a schematic diagram of a communication method according to Embodiment 2 of this application.

For example, FIG. 7 is a schematic diagram of the communication method according to Embodiment 2 of this application. The communication method specifically includes the following steps.

Step 701: The network device sends DCI to the first terminal device on the second BWP, where the DCI includes BWP information, the BWP information is used to determine a first BWP, and the first data channel is located in the first BWP.

Correspondingly, the first terminal device receives the DCI on the second BWP, and determines the first BWP and the first data channel based on the BWP information included in the DCI.

Step 702: The first terminal device receives, on the determined first BWP, a signal that is located on the first data channel and that is from the network device.

Figure 8:
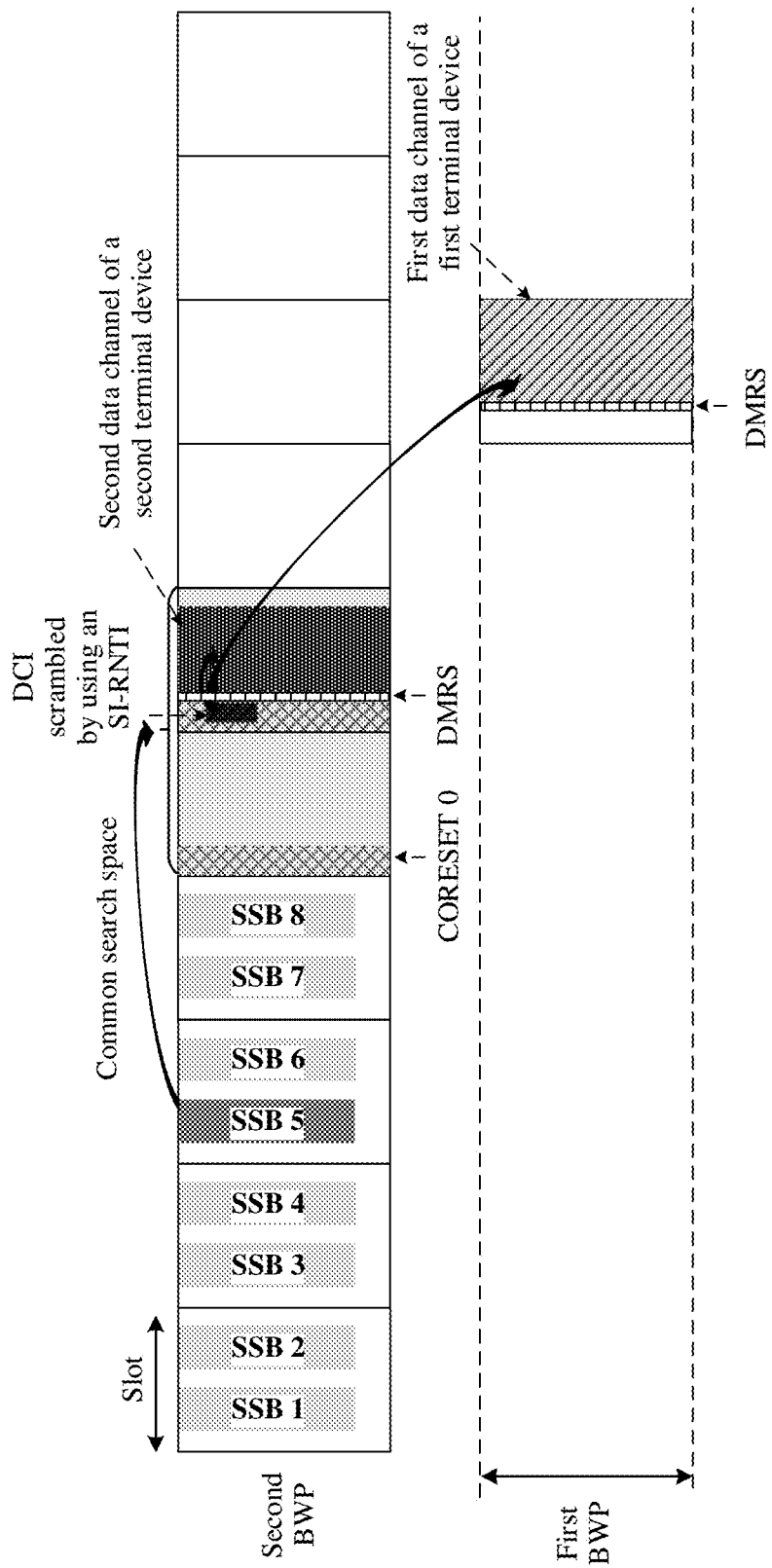
FIG. 8 is a schematic diagram of another indication manner of a data channel according to an embodiment of this application.

With reference to FIG. 8, the DCI is received on the second BWP in Step 702, and the first terminal device can obtain the BWP information included in the DCI, to determine a position of the first BWP, and obtain the signal from the first data channel on the first BWP. For example, if the signal is a SIB, the first terminal device can complete initial access.

In an implementation, the BWP information may include any one of the following information:
 (1) BWP offset information;
 (2) BWP offset information and first BWP bandwidth information; and
 (3) first BWP start position information and first BWP bandwidth information.

The first terminal device may determine a frequency domain interval between the second BWP and the first BWP based on the BWP offset information, for example, a frequency domain interval between a frequency domain start position of the second BWP and a frequency domain start position of the first BWP, or a frequency domain interval between a frequency domain end position of the second BWP and a frequency domain end position of the first BWP. The frequency domain interval may be represented by using a frequency domain offset value F, and F is greater than or equal to 0. The first terminal device may determine, based on the first BWP bandwidth information, bandwidth occupied by the first BWP. For example, the occupied bandwidth is represented by a quantity L" of available RBs. The first terminal device may determine the frequency domain start position of the first BWP based on the first BWP start position information. For example, the frequency domain start position may be represented by using a frequency domain start RB index value S".

The BWP information may be located in a newly added field of the DCI, for example, may be represented by using one or more bits in the reserved bit field mentioned above.

Optionally, the BWP information may correspond to C bits (where C is an integer). The following describes three cases.

In a first case, the C bits may correspond to one frequency domain offset value F. For example, F is directly indicated by using the C bits, or one row index is indicated by using the C bits, and a predefined table is searched by using the row index, to obtain corresponding F. In this case, it may be considered by default that the bandwidth occupied by the first BWP is the same as bandwidth occupied by the second BWP. Because the first terminal device knows a position of the second BWP, the first terminal device may determine a specific position of the first BWP based on F.

In a second case, the C bits may correspond to F and L". For example, in the C bits, C1 bits corresponds to F, and C2 bits corresponds to one L" (where C=C1+C2). Because the first terminal device knows a position of the second BWP, the first terminal device may determine a specific position of the first BWP based on F and L". For example, F is the frequency domain interval between the frequency domain start position of the second BWP and the frequency domain start position of the first BWP. In this case, the first terminal device determines the frequency domain start position of the first BWP based on F, and L" is added to the frequency domain start position backwards, to obtain the position of the first BWP.

In a third case, the C bits may correspond to S" and L". For example, in the C bits, C3 bits corresponds to S", and C4 bits corresponds to L" (where C=C3+C4). In this case, the first terminal device may directly determine the position of the first BWP without using position information of the second BWP, that is, the position of the first BWP is obtained by adding L" to S" backwards.

When L" is included in the BWP information, the bandwidth occupied by the first BWP may be configured based on an actual status. This improves system flexibility.

Optionally, when a value of C is 0, or the C bits carrying the BWP information defaults, the first BWP may be determined by using the first BWP information that may be pre-agreed on by the first terminal device and the network device.

Further, in this embodiment of this application, the first terminal device further needs to determine a specific time domain resource and frequency domain resource of the first data channel in the first BWP.

In an implementation, a manner of determining the specific time domain resource and frequency domain resource is a manner of determining the time domain resource and the frequency domain resource of the first data channel in Embodiment 1. For details, refer to Embodiment 1. In other words, in this case, Embodiment 1 and Embodiment 2 may be combined. Details are not described herein again. It should be noted that, in this case, a newly added field corresponding to the BWP information and a newly added field corresponding to the time domain resource information may be converted into a same newly added field for unified indication, or may be separate different newly added fields.

In another implementation, the first terminal device may reuse the information in the frequency domain resource assignment field and the time domain resource assignment field in the existing Table 1. In other words, a time frequency resource of the second data channel in the second BWP is determined as a time frequency resource of the first data channel in the first BWP.

Optionally, when the frequency domain resource assignment field in the existing Table 1 is reused, and bandwidth occupied by the first BWP and bandwidth occupied by the second BWP are different, a distinguishing operation may be performed based on the following specific cases.

As shown in FIG. 9(*a*), a shadow area is a frequency domain resource that is of the second data channel in the second BWP and that is obtained based on the existing frequency domain resource assignment field.

(1) If the bandwidth occupied by the first BWP is greater than the bandwidth occupied by the second BWP, as shown in FIG. 9(*b*), the frequency domain resource of the first data channel in the first BWP may be determined in a manner that is the same as that of determining the frequency domain resource of the second data channel in the second BWP.

(2) If the bandwidth occupied by the first BWP is less than the bandwidth occupied by the second BWP, and the length of the frequency domain resource determined by the frequency domain assignment field is greater than the bandwidth occupied by the first BWP, as shown in FIG. 9(*c*), it may be considered that the frequency domain resource of the first data channel fully occupies the first BWP.

Figure 9A:
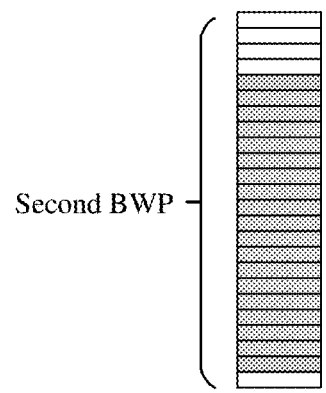
FIG. 9(a) to FIG. 9(d) are schematic diagrams of a position of a frequency domain resource according to an embodiment of this application.
Figure 9B:
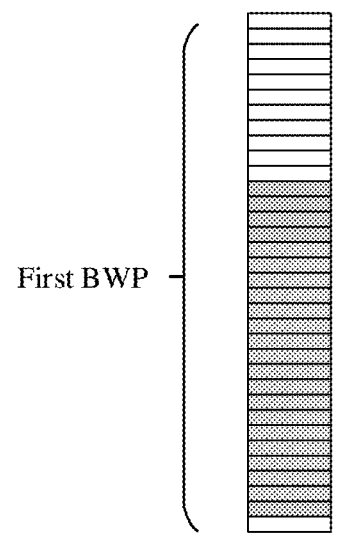
Figure 9C:
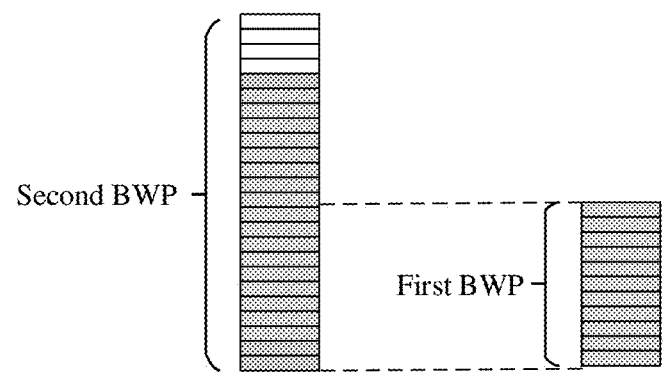
Figure 9D:
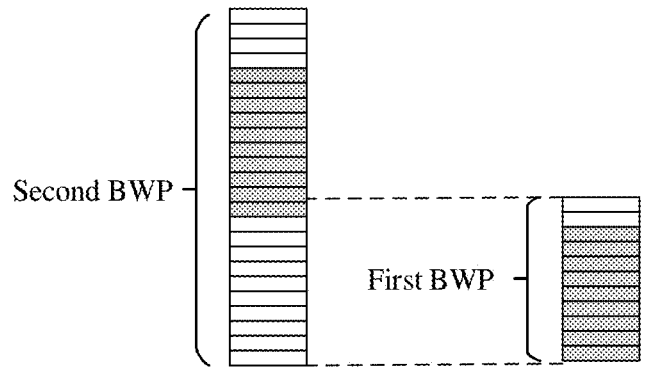

(3) If the bandwidth occupied by the first BWP is less than the bandwidth occupied by the second BWP, the length of the frequency domain resource determined by the frequency domain assignment field is less than or equal to the bandwidth occupied by the first BWP, and a part of the frequency domain resource determined by the frequency domain assignment field exceeds a range of the first BWP, as shown in FIG. 9(d), it may be considered that a start position of the frequency domain resource determined by the frequency domain assignment field is a start position of the first BWP, and the length of the frequency domain resource is still the length determined based on the frequency domain assignment field.

The foregoing operation helps improve forward compatibility.

Embodiment 3

In the foregoing Embodiment 1 or Embodiment 2, when the specific position of the first data channel is determined, at least a part of related information in an existing DCI field is reused. This reduces DCI overheads to different extents. Actually, each parameter for determining the position of the first channel may be separately indicated. In this manner, the position of the first data channel is not limited, to improve system flexibility.

Figure 10:
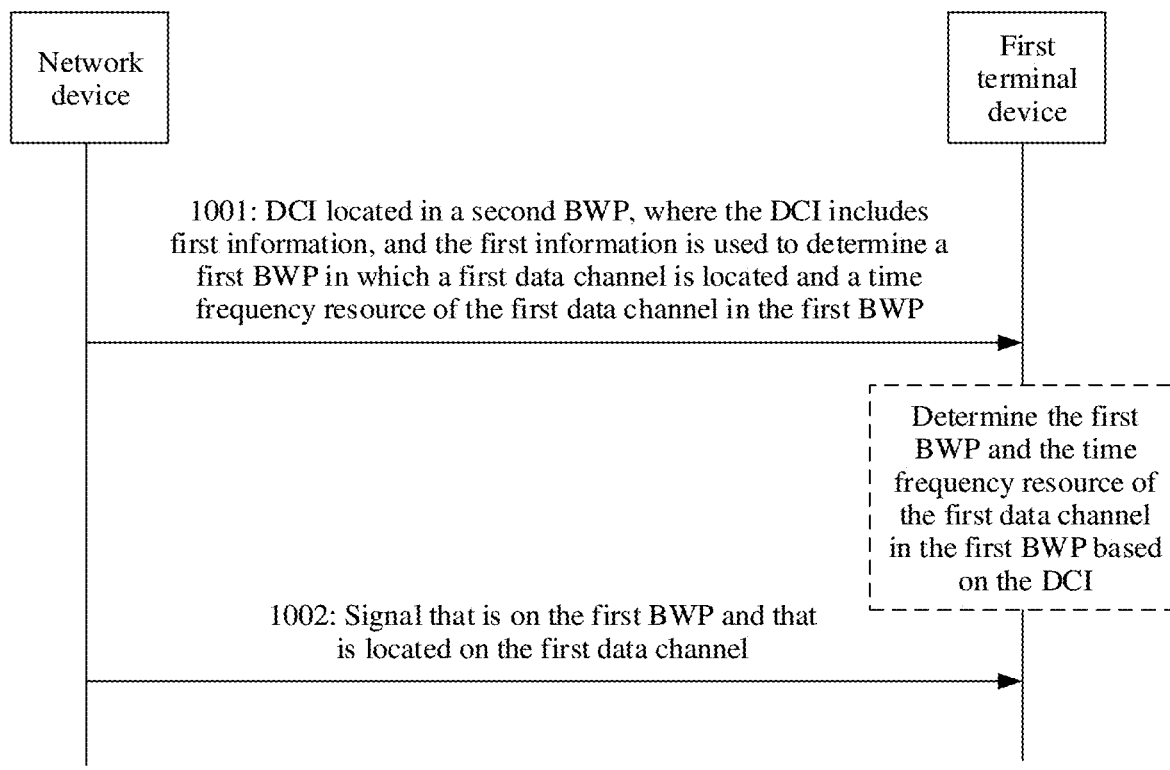
FIG. 10 is a schematic diagram of a communication method according to Embodiment 3 of this application.

Based on the foregoing concept, Embodiment 3 of this application provides a communication method shown in FIG. 10. The communication method specifically includes the following steps.

Step 1001: A network device sends DCI to a first terminal device on a second BWP, where the DCI includes first information, and the first information is used to determine a first BWP in which a first data channel is located and a time frequency resource of the first data channel in the first BWP.

Correspondingly, the first terminal device receives the DCI on the second BWP, and determines the first BWP and the time frequency resource of the first data channel in the first BWP based on the DCI.

Step 1002: The first terminal device receives, on the determined first BWP, a signal that is located on the first data channel and that is from the network device.

In an implementation, the first information includes BWP information, time domain resource information, and frequency domain resource information. The time domain resource information may further include time domain offset information, time domain start position information, and duration information. In this embodiment, the foregoing information is indicated by using newly added fields.

For example, the first terminal device and the network device may pre-agree on a table, as shown in Table 4.

TABLE 4

| Row index | F | L" | S" | K0' | RIV' | S' | L' |
|---|---|---|---|---|---|---|---|
| 1 | 24 | 24 | 0 | 2 | 229 | 1 | 10 |
| 2 | 48 | 12 | 2 | 4 | 332 | 0 | 14 |
| 3 | ... | ... | ... | ... | ... | ... | ... |

In Table 4, the frequency domain resource information is represented as RIV'. A frequency domain resource of the first data channel may be determined based on RIV' with reference to an existing manner of determining a frequency domain resource based on frequency domain resource assignment, or in a similar manner. For example, the first information may include a field of D bits, and the field of D bits corresponds to one row index. The first terminal device may obtain, by querying Table 3, K0", L", S", K0', RIV', S', and L' that corresponds to the row index. The first BWP may be determined based on F, L", and S", the frequency domain resource of the first data channel is determined based on RIV', and the time domain resource of the first data channel is determined based on K0', S', and L', so that the signal that is located on the first data channel and that is from the network device may be received on the determined first BWP. Optionally, the first information may be the D bits located in a reserved bit field of the DCI.

Embodiment 4

To save communication resources as much as possible, in Embodiment 4 of this application, a first data channel and a second data channel are located in a same BWP, and the first data channel and the second data channel are also located in a same time unit.

To ensure that communication between a first terminal device and a network device on the first data channel and communication between a second terminal device and the network device on the second data channel do not interfere with each other, it needs to be ensured that the second data channel and the first data channel are located on different time frequency resources. Based on the foregoing requirement, Embodiment 4 of this application provides the following four different solutions.

Solution 1

Figure 11:
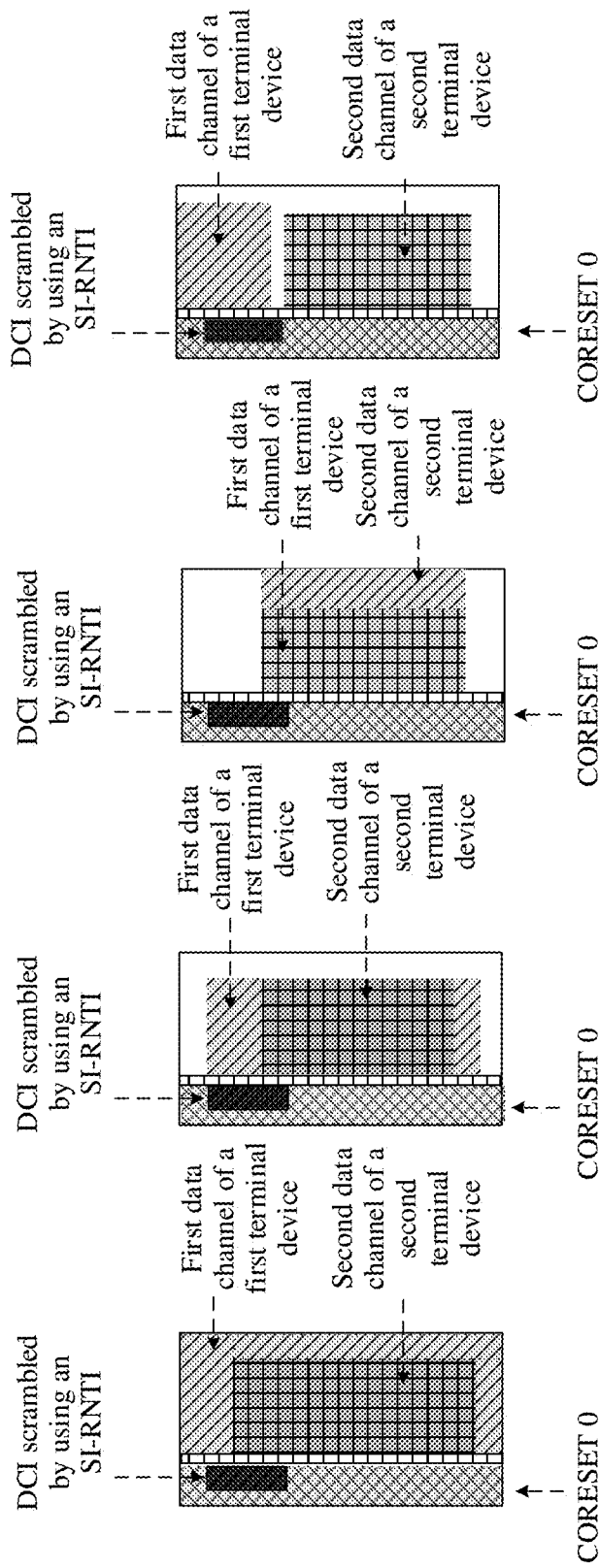
FIG. 11(a) to FIG. 11(d) are schematic diagrams of a position of a time domain resource according to Embodiment 4 of this application.

As shown in FIG. 11(a), the first terminal device considers by default that all remaining time frequency resources in a first time unit as a time frequency resource of the first data channel. In this case, no field needs to be newly added to DCI. This has an expression form consistent with that when the A bits or the B bits defaults in Embodiment 1, but has a meaning different from that when the A bits or the B bits defaults in Embodiment 1, and is a different solution.

According to Solution 1, the network device sends DCI to the first terminal device. Information in the DCI indicates a time frequency resource of a second data channel of the second terminal device and a first time frequency resource of the second data channel in the first time unit. The first terminal device receives the DCI, and receives, on a second time frequency resource in the first time unit, a signal on the first data channel of the first terminal based on the information in the DCI. The second time frequency resource is a remaining part other than the first time frequency resource in the first time unit.

Solution 2

As shown in FIG. 11(b), the first terminal device considers by default that the first data channel and the second data channel have a same time domain resource. In other words, the first terminal device may reuse time domain resource assignment of DCI to determine a time domain resource of the first data channel. A field needs to be newly added to the DCI to determine a frequency domain resource of the first data channel. For example, the newly added field corresponds to RIV', and may correspondingly determine a segment of frequency domain resource. If a part of the frequency domain resource determined based on RIV' overlaps with the second data channel, the first terminal device skips this part of frequency domain resource, that is, does not attempt to receive a signal on the first data channel on the frequency domain resource that overlaps with the second data channel. For a manner of determining the frequency domain resource based on RIV', refer to an existing manner of determining a frequency domain resource based on frequency domain resource assignment. Alternatively, a similar manner is used.

In Solution 2, the network device sends the DCI to the first terminal device. The DCI includes: time domain resource information, where the time domain resource information is used to determine first time domain resources, and the first time domain resources are a time domain resource on which the first data channel is located and a time domain resource on which the second data channel is located; and frequency domain resource information, where the frequency domain resource information is used to determine a first frequency domain resource, and the first frequency domain resource is a frequency domain resource on which the first data channel is located. The second data channel and the first data channel are located in a same time unit, and the frequency domain resource of the first data channel and the frequency domain resource of the second data channel do not overlap. The first terminal device receives the DCI, and receives, on the first time domain resource and the first frequency domain resource based on information in the DCI, a signal that is located on the first data channel and that is from the network device.

Solution 3

As shown in FIG. 11(c), the first terminal device considers by default that the first data channel and the second data channel have a same frequency domain resource. In other words, the first terminal device may reuse frequency domain resource assignment in DCI to determine a frequency domain resource of the first data channel, and a field needs to be newly added to the DCI to determine a time domain resource of the first data channel. For example, the newly added field corresponds to S' and L'. If a part of the time domain resource determined by S' and L' overlaps with the second data channel, the first terminal device skips this part of time domain resource, that is, does not attempt to receive a signal on the first data channel on the time domain resource that overlaps with the second data channel.

In Solution 3, the network device sends the DCI to the first terminal device. The DCI includes: frequency domain resource information, where the frequency domain resource information is used to determine first frequency domain resources, and the first frequency domain resources are a frequency domain resource on which the first data channel is located and a frequency domain resource on which the second data channel is located; and time domain resource information, where the time domain resource information is used to determine a first time domain resource, and the first time domain resource is a time domain resource on which the first data channel is located. The second data channel and the first data channel are located in a same time unit, and the frequency domain resource of the first data channel and the time domain resource of the second data channel do not overlap. The first terminal device receives the DCI, and receives, on the first time domain resource and the first frequency domain resource based on information in the DCI, a signal that is located on the first data channel and that is from the network device.

Solution 4

As shown in FIG. 11(d), a field needs to be newly added to DCI to determine a time domain resource and a frequency domain resource of the first data channel. In other words, a frequency domain resource assignment field and a time domain resource assignment field in the existing DCI are not reused. For example, the newly added field may correspond to RIV', S', and L'. The frequency domain resource of the first data channel is determined based on RIV', and the time domain resource of the first data channel is determined based on S' and L'. Manners of determining the time domain resource and the frequency domain resource of the first data channel are provided above. If a part of the frequency domain resource determined based on RIV' overlaps with the second data channel, the first terminal device skips this part of frequency domain resource, that is, does not attempt to receive a signal on the first data channel on the frequency domain resource that overlaps with the second data channel. If a part of the time domain resource determined by S' and L' overlaps with the second data channel, the first terminal device skips this part of time domain resource, that is, does not attempt to receive the signal on the first data channel on the time domain resource that overlaps with the second data channel.

In Solution 4, the network device sends the DCI to the first terminal device. The DCI includes: frequency domain resource information, where the frequency domain resource information is used to determine a first frequency domain resource, and the first frequency domain resource is a frequency domain resource on which the first data channel is located; and time domain resource information, where the time domain resource information is used to determine a first time domain resource, and the first time domain resource is a time domain resource on which the first data channel is located. The second data channel and the first data channel are located in a same time unit, and a time frequency resource of the first data channel and a time frequency domain resource of the second data channel do not overlap. The first terminal device receives the DCI, and receives, on the first time domain resource and the first frequency domain resource based on information in the DCI, a signal that is located on the first data channel and that is from the network device.

In an implementation, the newly added field in the foregoing Solutions 2 to 4 may be located in a reserved bit field in the DCI.

Embodiment 5

In the technical solutions separately provided in Embodiment 1 to Embodiment 4, the first data channel and the second data channel may be located in a same time unit or different time units in time domain. To help the first terminal device interprets each field in the DCI, Embodiment 5 of this application provides a mechanism based on the foregoing embodiments, so that the first terminal device determines whether the first data channel and the second data channel are located in a same time unit.

In an implementation, a newly added field, for example, a reserved field in the DCI, may include confirmation information, to determine whether the first data channel and the second data channel are located in a same time unit. For example, the newly added field includes one bit. When a value of the bit is "1", the first terminal device determines that the first data channel and the second data channel are located in a same time unit. When a value of the bit is "0", the first terminal device determines that the first data channel and the second data channel are located in different time units. This manner is directly clear, and the first terminal device does not need to perform a large quantity of information processing and determining.

In another implementation, whether the first data channel and the second data channel are located in a same time unit may be determined by using the frequency domain resource assignment field and/or the time domain assignment field in the DCI shown in the existing Table 1. Specifically, the following several possibilities are further included.

(1) Determine by using the time domain resource assignment field. The time domain resource assignment field may determine S and L values of the second data channel. For example, when S and/or L is greater than (or less than) a threshold, the first terminal device may determine that the first data channel and the second data channel are located in a same time unit. On the contrary, the first terminal device determines that the first data channel and the second data channel are located in different time units. For example, when S and/or L is an odd number (or an even number), the first terminal device determines that the first data channel and the second data channel are located in a same time unit. On the contrary, the first terminal device determines that the first data channel and the second data channel are located in different time units.

(2) Determine by using the frequency domain resource assignment field. The frequency domain resource assignment field may determine S" and L" values of the second data channel. For example, when S" and/or L" is greater than (or less than) a threshold, the first terminal device may determine that the first data channel and the second data channel are located in a same time unit. On the contrary, the first terminal device determines that the first data channel and the second data channel are located in different time units. For example, when S" and/or L" is an odd number (or an even number), the first terminal device determines that the first data channel and the second data channel are located in a same time unit. On the contrary, the first terminal device determines that the first data channel and the second data channel are located in different time units.

(3) Determine by using a combination of the frequency domain resource assignment field and the time domain resource assignment field. A total quantity of time frequency resources occupied by the second data channel may be determined based on the frequency domain resource assignment field and the time domain resource assignment field. For example, when the total quantity of time frequency resources occupied by the second data channel is greater than (or less than) a threshold, the first terminal device may determine that the first data channel and the second data channel are located in a same time unit. On the contrary, the first terminal device determines that the first data channel and the second data channel are located in different time units. For example, when the total quantity of time frequency resources occupied by the second data channel is an odd number (or an even number), the first terminal device may determine that the first data channel and the second data channel are located in a same time unit. On the contrary, the first terminal device determines that the first data channel and the second data channel are located in different time units.

In the foregoing indication manner, no additional field needs to be newly added, to help reduce system overheads.

Embodiment 6

In addition to the foregoing initial access process, Embodiment 1 to Embodiment 5 of this application may be further extended to a paging process. In the conventional technology, a terminal device may obtain, by receiving DCI that is sent by a network device and that is scrambled by using a paging-radio network temporary identifier (P-RNTI), a time frequency resource of a data channel on which a paging message is located. Specifically, the DCI scrambled by using the P-RNTI is similar to the DCI scrambled by using the SI-RNTI, and also includes at least a frequency domain resource assignment field, a time domain assignment field, and a reserved bit field. An indication manner of a time domain resource and a frequency domain resource of a data channel scheduled by the DCI scrambled by using the P-RNTI is consistent with an indication manner of a time domain resource and a frequency domain resource of a data channel scheduled by the DCI scrambled by using the SI-RNTI. Refer to descriptions in a related paragraph. Details are not described herein again.

Compared with the conventional technology, in this embodiment of this application, the DCI that is scrambled by using the P-RNTI and that is sent by the network device is expected to indicate the time frequency resource of the data channel on which the paging message is located, the DCI scrambled by using the P-RNTI is also expected to indicate a time frequency resource of a data channel on which the network device sends downlink small data to the terminal device. In this way, DCI overheads in a system are reduced as much as possible.

Based on the foregoing requirement, in Embodiment 6 of this application, application scenarios of Embodiment 1 to Embodiment 5 are extended, that is, an application scenario is extended from the initial access process to the paging process. It should be noted that, in Embodiment 6, the first data channel in Embodiment 1 to Embodiment 5 may be a PDSCH carrying the downlink small data, the second data channel may be a PDSCH carrying the paging message, and the signal located on the first data channel may be the downlink small data. The terminal device that receives the DCI scrambled by using the P-RNTI may be the first terminal device or the second terminal device in Embodiment 1 to Embodiment 5, that is, may be understood as a type of terminal device, may be a new terminal device, for example, an NR-light terminal device, different from an existing common terminal device, or may be an existing common terminal device. This embodiment further improves performance of the terminal device.

Figure 12:
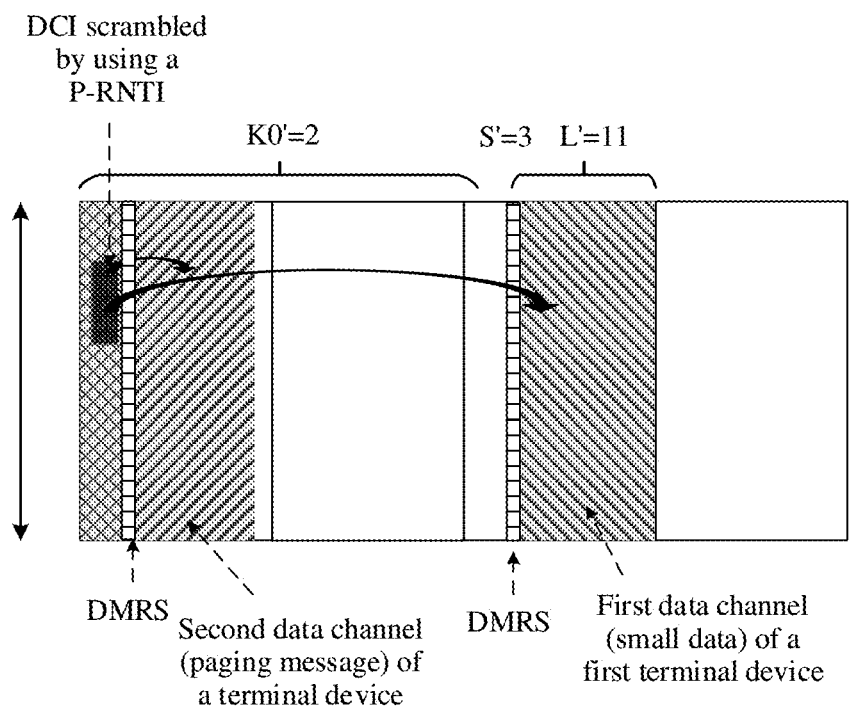
FIG. 12 is a schematic diagram of still another indication manner of a data channel according to an embodiment of this application.

Different from the first terminal device in Embodiment 1 to Embodiment 5, the terminal device in this embodiment of this application receives the signal located on the first data channel, namely, the downlink small data, and further receives a signal located on the second data channel, namely, the paging message. However, a manner of indicating, by the DCI scrambled by using the P-RNTI, a time frequency resource on which the first data channel is located is consistent with those in Embodiment 1 to Embodiment 5. For a method process of the manner, refer to the foregoing embodiments. Therefore, details are not described again in this embodiment of this application, and only one indication manner is briefly described with reference to FIG. 12 for ease of understanding.

As described above, the time domain resource information in Step 501 specifically includes K0', S', and L'. For example, in FIG. 12, K0'=2, S'=3, and L'=11. K0', S', and L' may be independent of the information in the time domain resource assignment field in the existing Table 1, and may be information in a newly added field. For example, the newly added field is located in a reserved bit field of the DCI scrambled by using the P-RNTI. The terminal device in Embodiment 6 of this application is configured to read all DCI fields including the reserved bit field. In this way, the terminal device not only can obtain K0, S, and L, but also can obtain K0', S', and L' in the manner described in Embodiment 1. In addition, because frequency domain resource information used to indicate frequency domain resources of the first data channel and the second data channel may be obtained by using a frequency domain assignment field of the DCI scrambled by using the P-RNTI, the terminal device may receive, based on the determined frequency domain resources and the determined time domain resource information, the received downlink small data on the first data channel, and receive, based on the conventional technology, the paging message on the second data channel.

Other technical solutions in Embodiment 1 to Embodiment 5 may be similarly introduced into the scenario in Embodiment 6 without any obstacle, which is understandable to a person skilled in the art.

The two data channels of the terminal device are indicated by using the DCI. In this embodiment of this application, this can effectively reduce system overheads, and improve resource utilization. A problem that a channel capacity for carrying the paging message is insufficient may be also resolved.

In the foregoing embodiments of this application, the communication method provided in embodiments of this application is described from a perspective of a terminal device used as an execution body. To implement various functions in the communication method provided in embodiments of this application, the terminal device may include a hardware structure and/or a software module, to implement the functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

Embodiment 7

Figure 13:
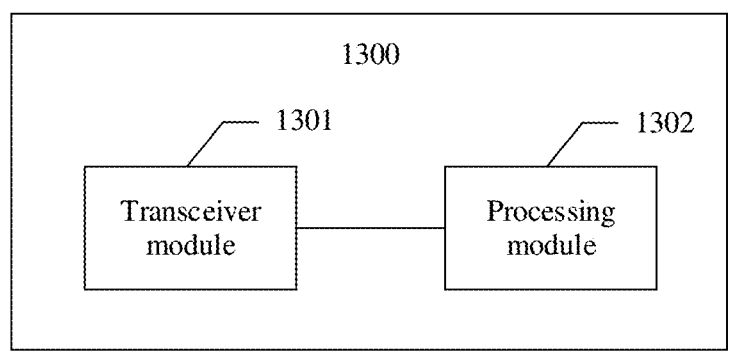
FIG. 13 is a schematic diagram of a structure of an apparatus according to an embodiment of this application.

Same as the foregoing concept, as shown in FIG. 13, an embodiment of this application further provides an apparatus 1300. The apparatus 1300 includes a transceiver module 1301 and a processing module 1302.

In an example, the apparatus 1300 is configured to implement a function of the terminal device in Embodiment 1 to Embodiment 6. The apparatus 1300 may be the first terminal device, or may be an apparatus located in the first terminal device. The apparatus may be a chip system. The chip system may include a chip, or may include a chip and another discrete component.

The transceiver module 1301 is configured to receive information from a network device or send information to the network device. The processing module 1302 is configured to complete another function other than an information receiving and sending function. In this application, information may include data, signaling, a reference signal, and the like.

Specifically, implementing a function of the first terminal device in Embodiment 1 is used as an example. The processing module 1302 is configured to control the transceiver module 1301 to receive downlink control information DCI from the network device. The DCI includes: time domain resource information, where the time domain resource information is used to determine a time domain resource, and the time domain resource is a time domain resource on which a first data channel is located; and frequency domain resource information, where the frequency domain resource information is used to determine frequency domain resources, the frequency domain resources are a frequency domain resource on which the first data channel is located and a frequency domain resource on which a second data channel is located. The second data channel is located on a time domain resource different from the time domain resource on which the first data channel is located. The processing module 1302 may determine, based on the received DCI, the frequency domain resource and the time domain resource on which the first data channel is located. The processing module 1302 is further configured to control the transceiver module 1301 to receive, on the determined time domain resource and the determined frequency domain resources, a signal that is located on the first data channel and that is from the network device. The first data channel is used by the first terminal device to communicate with the network device, and the second data channel is used by a second terminal device to communicate with the network device.

In another example, the apparatus 1300 is configured to implement a function of the network device in the foregoing methods. The apparatus 1300 may be the network device, or may be an apparatus located in the network device. The apparatus may be a chip system. The chip system may include a chip, or may include a chip and another discrete component.

The transceiver module 1301 is configured to receive information from the network device or send information to the network device. The processing module 1302 is configured to complete another function other than an information receiving and sending function.

Specifically, implementing a function of the network device in Embodiment 1 is used as an example. The processing module 1302 is configured to control the transceiver module 1301 to send downlink control information DCI to a first terminal device. The DCI includes: time domain resource information, where the time domain resource information is used to determine a time domain resource, and the time domain resource is a time domain resource on which a first data channel is located; and frequency domain resource information, where the frequency domain resource information is used to determine frequency domain resources, the frequency domain resources are a frequency domain resource on which the first data channel is located and a frequency domain resource on which a second data channel is located. The second data channel is located on a time domain resource different from the time domain resource on which the first data channel is located. The processing module 1302 is further configured to control the transceiver module 1301 to send, on the time domain resource and the frequency domain resource, a signal on the first data channel to the first terminal device. The first data channel is used by the network device to communicate with the first terminal device, and the second data channel is used by the network device to communicate with a second terminal device.

For specific execution processes of the transceiver module 1301 and the processing module 1302, refer to the descriptions in Embodiment 1. In this embodiment of this application, division into modules is an example and is merely logical function division. There may be another division manner during actual implementation. In addition, various function modules in this embodiment of this application may be integrated into one processor, or each of the modules may exist alone physically, or two or more modules are integrated into one module. The integrated module may be implemented in a form of hardware, or may be implemented in a form of a software function module.

It may be understood that the apparatus 1300 may be further configured to implement functions of the first terminal device and the network device in Embodiment 2 to Embodiment 6. With reference to the descriptions of the foregoing apparatus embodiment and the process descriptions in Embodiment 2 to Embodiment 6, a person skilled in the art can easily obtain apparatus embodiments for implementing the terminal device and the network device in Embodiment 2 to Embodiment 6 without creative efforts. Details are not described herein again.

Embodiment 8

Figure 14:
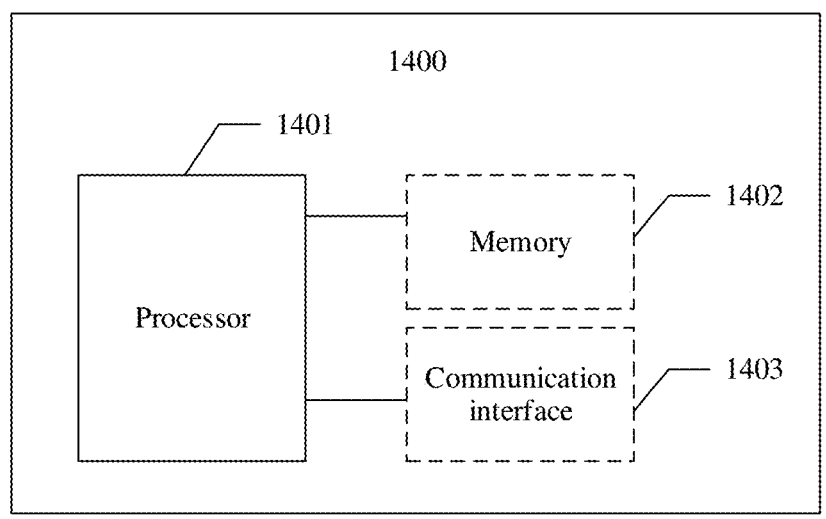
FIG. 14 is a schematic diagram of a structure of another apparatus according to an embodiment of this application.

Same as the foregoing concept, as shown in FIG. 14, an embodiment of this application further provides an apparatus 1400. The apparatus 1400 includes one or more processors 1401.

In an example, the apparatus 1400 is configured to implement a function of the first terminal device in the foregoing methods. The apparatus 1400 may be the first terminal device, or may be an apparatus, for example a chip, used in the first terminal device. The processor 1401 is configured to implement a function of the terminal device in the foregoing Embodiment 1 to Embodiment 6. For details, refer to the detailed descriptions in Embodiment 1 to Embodiment 6. Details are not described herein again.

In another example, the apparatus 1400 is configured to implement a function of the network device in the foregoing methods. The apparatus 1400 may be the network device, or may be an apparatus, for example, a chip, used in the network device. The apparatus 1400 includes at least one processor 1401, configured to implement a function of the network device in Embodiment 1 to Embodiment 6.

In some implementations, the apparatus 1400 may further include at least one memory 1402, configured to store program instructions and/or data. The memory 1402 is coupled to the processor 1401. Coupling in this embodiment of this application is indirect coupling or a communication connection between apparatuses, units, or modules, may be in an electrical form, a mechanical form, or another form, and is used for information exchange between the apparatuses, the units, or the modules. In another implementation, the memory 1402 may be alternatively located outside the apparatus 1400. The processor 1401 may operate with the memory 1402. The processor 1401 may execute the program instructions stored in the memory 1402. At least one of the at least one memory may be included in the processor.

The processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. With reference to the steps of the methods disclosed in embodiments of this application, the steps of the methods may be directly performed by hardware in the processor, or the steps of the methods may be performed by using a combination of hardware in the processor and a software module.

The memory may be a non-volatile memory, for example, a hard disk (HD) or a solid-state drive (SSD), or may be a volatile memory, for example, a random access memory (RAM). The memory is any medium that can be configured to carry or store program code in a form of instructions or a data structure and that can be accessed by a computer, but is not limited thereto. The memory in this embodiment of this application may be alternatively a circuit or any other apparatus that can implement a storage function, and is configured to store program instructions and/or data.

In some embodiments, the apparatus 1400 may further include a communication interface 1403, configured to communicate with another device through a transmission medium, so that the apparatus 1400 can communicate with the another device. For example, the communication interface 1403 may be a transceiver, a circuit, a bus, or another type of communication interface, and the another device may be a network device. The processor 1401 receives and sends information through the communication interface 1403, and is configured to implement the methods in the foregoing Embodiment 1 to Embodiment 6.

A connection medium between the communication interface 1403, the processor 1401, and the memory 1402 is not limited in this embodiment of this application. For example, the communication interface 1403, the processor 1401, and the memory 1402 may be connected through a bus. The bus may include at least one of an address bus, a data bus, or a control bus.

Embodiment 9

Same as the foregoing concept, Embodiment 9 of this application provides an electronic device. The electronic device is configured to implement a function of the first terminal device in the foregoing methods. The electronic device may be the first terminal device, or may be an apparatus, for example, a chip, used in the first terminal device. The electronic device provided in this embodiment is configured to implement a function of the first terminal device in the foregoing Embodiment 1 to Embodiment 6. For details, refer to the detailed descriptions in Embodiment 1 to Embodiment 6. Details are not described herein again.

Figure 15:
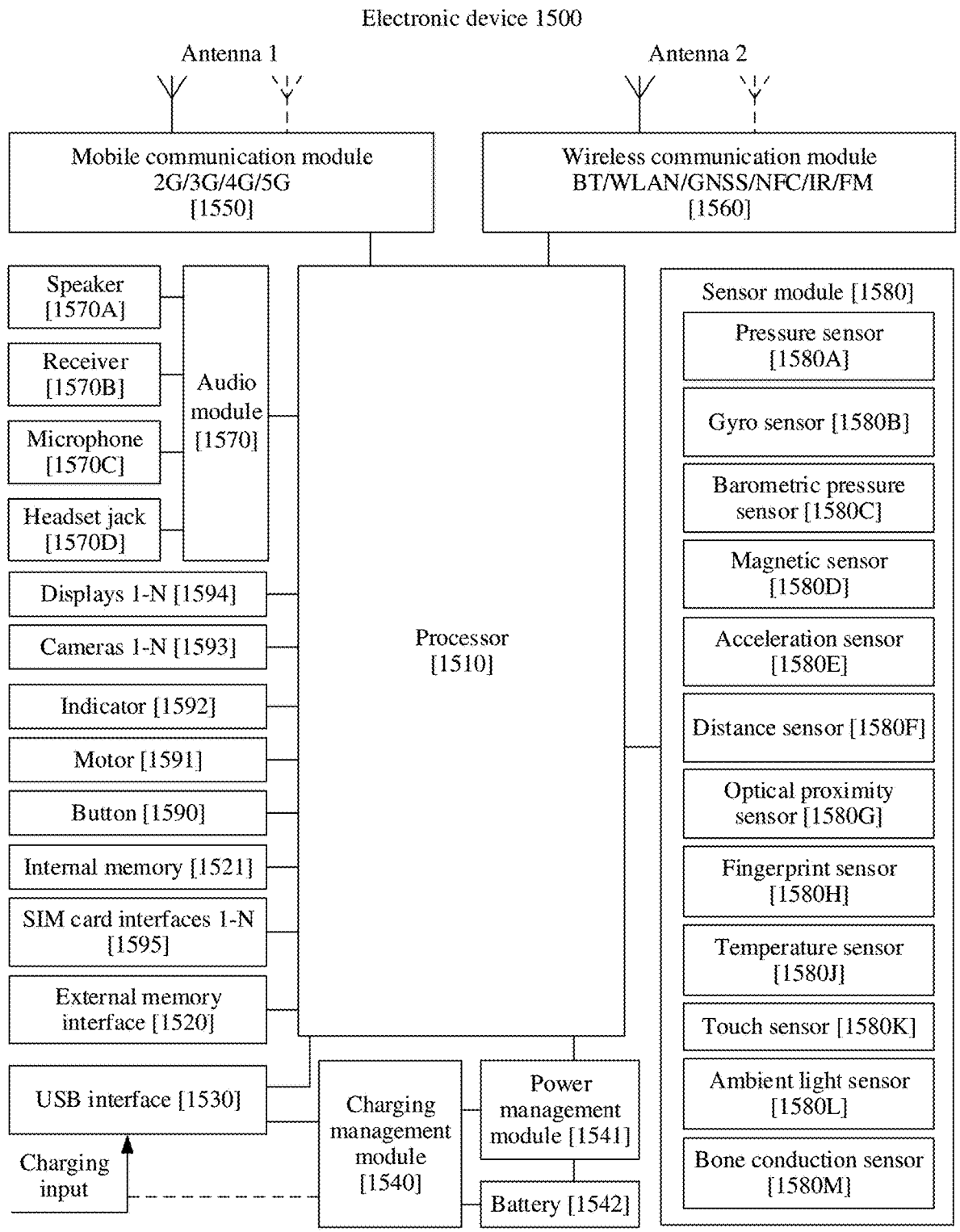
FIG. 15 is a schematic diagram of a structure of an electronic device according to an embodiment of this application.

FIG. 15 is a schematic diagram of a general structure of the electronic device. As described above, the first terminal device may be an NR-light terminal device. Compared with a common terminal device, the NR-light terminal device has lower manufacturing costs, and has lower bandwidth and lower power consumption for communicating with a network device. In other words, the NR-light terminal device may include some or all components of the electronic device 1500 shown in FIG. 15. The following describes the electronic device 1500 in FIG. 15 in detail.

The electronic device 1500 may include a processor 1510, an external memory interface 1520, an internal memory 1521, a universal serial bus (USB) interface 1530, a charging management module 1540, a power management module 1541, a battery 1542, an antenna 1, an antenna 2, a mobile communication module 1550, a wireless communication module 1560, an audio module 1570, a speaker 1570A, a receiver 1570B, a microphone 1570C, a headset jack 1570D, a sensor module 1580, a button 1590, a motor 1591, an indicator 1592, a camera 1593, a display 1594, a subscriber identity module (SIM) card interface 1595, and the like. The sensor module 1580 may include a pressure sensor 1580A, a gyro sensor 1580B, a barometric pressure sensor 1580C, a magnetic sensor 1580D, an acceleration sensor 1580E, a distance sensor 1580F, an optical proximity sensor 1580G, a fingerprint sensor 1580H, a temperature sensor 1580J, a touch sensor 1580K, an ambient light sensor 1580L, a bone conduction sensor 1580M, and the like.

It may be understood that the structure shown in this embodiment of this application does not constitute a specific limitation on the electronic device 1500. In some other embodiments of this application, the electronic device 1500 may include more or fewer components than those shown in the figure, or some components may be combined, or some components may be split, or there may be a different component layout. The components shown in the figure may be implemented by hardware, software, or a combination of software and hardware.

The processor 1510 may include one or more processing units. For example, the processor 1510 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction fetching and instruction execution.

A memory may be further disposed in the processor 1510, and is configured to store instructions and data. In some embodiments, the memory in the processor 1510 is a cache memory. The memory may store instructions or data just used or cyclically used by the processor 1510. If the processor 1510 needs to use the instructions or the data again, the processor 1510 may directly invoke the instructions or the data from the memory. This avoids repeated access and reduces a waiting time of the processor 1510, thereby improving system efficiency.

In some embodiments, the processor 1510 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, and includes one serial data line (SDA) and one serial clock line (SCL). In some embodiments, the processor no may include a plurality of groups of I2C buses. The processor 1510 may be separately coupled to the touch sensor 1580K, a charger, a flash, the camera 1593, and the like through different I2C bus interfaces. For example, the processor 1510 may be coupled to the touch sensor 1580K through the I2C interface, so that the processor 1510 communicates with the touch sensor 1580K through the I2C bus interface, to implement a touch function of the electronic device 1500.

The I2S interface may be configured to perform audio communication. In some embodiments, the processor 1510 may include a plurality of groups of I2S buses. The processor 1510 may be coupled to the audio module 1570 through the I2S bus, to implement communication between the processor 1510 and the audio module 1570. In some embodiments, the audio module 1570 may transmit an audio signal to the wireless communication module 1560 through the I2S interface, to implement a function of answering a call by using a Bluetooth headset.

The PCM interface may be also configured to perform audio communication, and sample, quantize, and code an analog signal. In some embodiments, the audio module 1570 may be coupled to the wireless communication module 1560 through a PCM bus interface. In some embodiments, the audio module 1570 may alternatively transmit an audio signal to the wireless communication module 1560 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 1510 to the wireless communication module 1560. For example, the processor 1510 communicates with a Bluetooth module in the wireless communication module 1560 through the UART interface, to implement a Bluetooth function. In some embodiments, the audio module 1570 may transmit an audio signal to the wireless communication module 1560 through the UART interface, to implement a function of playing music by using a Bluetooth headset.

The MIPI interface may be configured to connect the processor 1510 to a peripheral component for example, the display 1594 or the camera 1593. The MIPI interface includes a camera serial interface (CSI), a display serial interface (DSI), and the like. In some embodiments, the processor 1510 communicates with the camera 1593 through the CSI interface, to implement a photographing function of the electronic device 1500. The processor 1510 communicates with the display 1594 through the DSI interface, to implement a display function of the electronic device 1500.

The GPIO interface may be configured by using software. The GPIO interface may be configured as a control signal or a data signal. In some embodiments, the GPIO interface may be configured to connect the processor 1510 to the camera 1593, the display 1594, the wireless communication module 1560, the audio module 1570, the sensor module 1580, and the like. The GPIO interface may be alternatively configured as an I2C interface, an I2S interface, an UART interface, an MIPI interface, or the like.

The USB interface 1530 is an interface that conforms to a USB standard specification, and may be specifically a mini USB interface, a micro USB interface, a USB type-C interface, or the like. The USB interface 1530 may be configured to connect to the charger to charge the electronic device 1500, or may be configured to transmit data between the electronic device 1500 and a peripheral device. The USB interface 1530 may be alternatively configured to connect to a headset, to play audio through the headset. The interface may be further configured to connect to another electronic device such as an AR device.

It may be understood that an interface connection relationship between the modules illustrated in this embodiment of this application is merely used as an example for description, and does not constitute a limitation on the structure of the electronic device 1500. In some other embodiments of this application, the electronic device 1500 may alternatively use an interface connection manner different from that in the foregoing embodiment, or a combination of a plurality of interface connection manners.

The charging management module 1540 is configured to receive a charging input from the charger. The charger may be a wireless charger or a wired charger. In some embodiments of wired charging, the charging management module 1540 may receive a charging input from the wired charger through the USB interface 1530. In some embodiments of wireless charging, the charging management module 1540 may receive a wireless charging input through a wireless charging coil of the electronic device 1500. When charging the battery 1542, the charging management module 1540 may further supply power to the electronic device by using the power management module 1541.

The power management module 1541 is configured to connect the battery 1542, the charging management module 1540, and the processor 1510. The power management module 1541 receives an input from the battery 1542 and/or the charging management module 1540, and supplies power to the processor 1510, the internal memory 1521, an external memory, the display 1594, the camera 1593, the wireless communication module 1560, and the like. The power management module 1541 may be further configured to monitor parameters such as a battery capacity, a battery cycle count, and a battery health status (electric leakage or impedance). In some other embodiments, the power management module 1541 may be alternatively disposed in the processor 1510. In some other embodiments, the power management module 1541 and the charging management module 1540 may be alternatively disposed in a same device.

A wireless communication function of the electronic device 1500 may be implemented by using the antenna 1, the antenna 2, the mobile communication module 1550, the wireless communication module 1560, the modem processor, the baseband processor, and the like.

The antenna 1 and the antenna 2 are configured to transmit and receive electromagnetic wave signals. Each antenna in the electronic device 1500 may be configured to cover one or more communication frequency bands. Different antennas may be further multiplexed to improve antenna utilization. For example, the antenna 1 may be multiplexed as a diversity antenna of a wireless local area network. In some other embodiments, an antenna may be used in combination with a tuning switch.

The mobile communication module 1550 may provide a solution that is applied to the electronic device 100 and that includes wireless communication such as 2G, 3G, 4G, and 5G. The mobile communication module 1550 may include at least one filter, a switch, a power amplifier, a low noise amplifier (LNA), and the like. The mobile communication module 1550 may receive an electromagnetic wave through the antenna 1, perform processing such as filtering and amplification on the received electromagnetic wave, and transmit a processed electromagnetic wave to the modem processor for demodulation. The mobile communication module 1550 may further amplify a signal modulated by the modem processor, and convert an amplified signal into an electromagnetic wave for radiation through the antenna 1. In some embodiments, at least some function modules of the mobile communication module 1550 may be disposed in the processor no. In some embodiments, at least some function modules of the mobile communication module 1550 and at least some modules of the processor 1510 may be disposed in a same component.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 1570A, the receiver 1570B, and the like), or displays an image or a video through the display 1594. In some embodiments, the modem processor may be an independent component. In some other embodiments, the modem processor may be independent of the processor 1510, and is disposed in the same component as the mobile communication module 1550 or another function module.

The wireless communication module 1560 may provide a solution that is applied to the electronic device 1500 and that includes wireless communication such as a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 1560 may be one or more components integrating at least one communication processing module. The wireless communication module 1560 receives an electromagnetic wave through the antenna 2, performs frequency modulation and filtering processing on an electromagnetic wave signal, and sends a processed signal to the processor 1510. The wireless communication module 1560 may further receive a to-be-sent signal from the processor 1510, perform frequency modulation and amplification on the signal, and convert a processed signal into an electromagnetic wave for radiation through the antenna 2.

In some embodiments, in the electronic device 1500, the antenna 1 and the mobile communication module 1550 are coupled, and the antenna 2 and the wireless communication module 1560 are coupled, so that the electronic device 1500 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 1500 implements a display function by using the GPU, the display 1594, the application processor, and the like. The GPU is a microprocessor for image processing, and is connected to the display 1594 and the application processor. The GPU is configured to perform mathematical and geometrical calculation, and is configured to perform graphics rendering. The processor 1510 may include one or more GPUs that execute program instructions to generate or change display information.

The display 1594 is configured to display an image, a video, or the like. The display 1594 includes a display panel. The display panel may use a liquid crystal display (LCD), an organic light-emitting diode (OLED), an active-matrix organic light-emitting diode (AMOLED), a flexible light-emitting diode (FLED), a mini-LED, a micro-LED, a micro-OLED, quantum dot light-emitting diodes (QLEDs), or the like. In some embodiments, the electronic device 1500 may include one or N displays 1594, where N is a positive integer greater than 1.

The electronic device 1500 can implement a photographing function by using the ISP, the camera 1593, the video codec, the GPU, the display 1594, the application processor, and the like.

The ISP is configured to process data fed back by the camera 1593. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 1593.

The camera 1593 is configured to capture a static image or a video. An optical image of an object is generated through the lens, and is projected to the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 1500 may include one or N cameras 1593, where N is a positive integer greater than 1.

The digital signal processor is configured to process a digital signal, and may process another digital signal in addition to the digital image signal. For example, when the electronic device 1500 selects a frequency, the digital signal processor is configured to perform Fourier transform or the like on frequency energy.

The video codec is configured to compress or decompress a digital video. The electronic device 1500 may support one or more types of video codecs. In this way, the electronic device 1500 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 1500, for example, image recognition, facial recognition, speech recognition, and text understanding, can be implemented by using the NPU.

The external memory interface 1520 may be configured to connect to an external memory card, for example, a micro SD card, to extend a storage capability of the electronic device 1500. The external storage card communicates with the processor 1510 through the external memory interface 1520, to implement a data storage function. For example, files such as music and videos are stored in the external memory card.

The internal memory 1521 may be configured to store computer-executable program code. The executable program code includes instructions. The processor 1510 runs the instructions stored in the internal memory 1521, to perform various function applications of the electronic device 1500 and data processing. The internal memory 1521 may include a program storage area and a data storage area. The program storage area may store an operating system, an application required by at least one function (for example, a voice playing function or an image playing function), and the like. The data storage area may store data (for example, audio data or a phone book) created during use of the electronic device 1500, and the like. In addition, the internal memory 1521 may include a high-speed random access memory, and may further include a non-volatile memory, for example, at least one magnetic disk storage component, a flash component, or a universal flash storage (UFS).

The electronic device 1500 may implement an audio function, for example, music playing or recording, by using the audio module 1570, the speaker 1570A, the receiver 1570B, the microphone 1570C, the headset jack 1570D, the application processor, and the like.

The audio module 1570 is configured to convert digital audio information into an analog audio signal for output, and is also configured to convert an analog audio input into a digital audio signal. The audio module 1570 may be further configured to encode and decode an audio signal. In some embodiments, the audio module 1570 may be disposed in the processor 1510, or some function modules of the audio module 1570 are disposed in the processor 1510.

The speaker 1570A, also referred to as a "loudspeaker", is configured to convert an audio electrical signal into a sound signal. The electronic device 1500 may be used to listen to music or answer a call in a hands-free mode by using the speaker 1570A.

The receiver 1570B, also referred to as an "earpiece", is configured to convert an audio electrical signal into a sound signal. When the electronic device 1500 is used to answer a call or receive voice information, the receiver 1570B may be placed close to a human ear to listen to a voice.

The microphone 1570C, also referred to as a "mike" or a "mic", is configured to convert a sound signal into an electrical signal. When a user makes a call, or sends voice information, the user may make a sound near the microphone 1570C through the mouth of the user, to input a sound signal to the microphone 1570C. At least one microphone 1570C may be disposed in the electronic device 1500. In some other embodiments, two microphones 1570C may be disposed in the electronic device 1500, to collect a sound signal and further implement a noise reduction function. In some other embodiments, three, four, or more microphones 1570C may be alternatively disposed in the electronic device 1500, to collect a sound signal, implement noise reduction, and identify a sound source, to implement a directional recording function and the like.

The headset jack 1570D is configured to connect to a wired headset. The headset jack 1570D may be the USB interface 1530, or may be a 3.5 mm open mobile terminal platform (OMTP) standard interface or a cellular telecommunications industry association of the USA (CTIA) standard interface.

The pressure sensor 1580A is configured to sense a pressure signal, and may convert the pressure signal into an electrical signal. In some embodiments, the pressure sensor 1580A may be disposed on the display 1594. There are a plurality of types of pressure sensors 1580A, such as a resistive pressure sensor, an inductive pressure sensor, and a capacitive pressure sensor.

The capacitive pressure sensor may include at least two parallel plates made of conductive materials. Capacitance between electrodes changes when force is applied to the pressure sensor 1580A. The electronic device 1500 determines pressure intensity based on the change of the capacitance. When a touch operation is performed on the display 1594, the electronic device 1500 detects intensity of the touch operation by using the pressure sensor 1580A. The electronic device 1500 may also compute a touch position based on a detection signal of the pressure sensor 1580A. In some embodiments, touch operations that are performed at a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating an SMS message is executed.

The gyro sensor 1580B may be configured to determine a motion posture of the electronic device 1500. In some embodiments, angular velocities of the electronic device 1500 around three axes (namely, axes x, y, and z) may be determined by using the gyro sensor 1580B. The gyro sensor 1580B may be configured to implement image stabilization during photographing. For example, when the shutter is pressed, the gyro sensor 1580B detects an angle at which the electronic device 1500 jitters, obtains, through calculation based on the angle, a distance for which a lens module needs to compensate, and allows the lens to cancel the jitter of the electronic device 1500 through reverse motion, to implement image stabilization. The gyro sensor 1580B may be further used in a navigation scenario and a motion-sensing game scenario.

The barometric pressure sensor 1580C is configured to measure barometric pressure. In some embodiments, the electronic device 1500 calculates an altitude based on a barometric pressure value measured by the barometric pressure sensor 1580C, to assist in positioning and navigation.

The magnetic sensor 1580D includes a Hall sensor. The electronic device 1500 may detect opening and closing of a flip cover by using the magnetic sensor 1580D. In some embodiments, when the electronic device 1500 is a flip phone, the electronic device 1500 may detect opening and closing of a flip cover by using the magnetic sensor 1580D. Further, a feature, for example, automatic unlocking upon opening of the flip cover is set based on a detected opening or closing state of the flip cover.

The acceleration sensor 1580E may detect accelerations in various directions (usually on three axes) of the electronic device 1500. When the electronic device 1500 is still, magnitude and a direction of gravity may be detected. The acceleration sensor 1580E may be further configured to recognize a posture of the electronic device, and is used in screen switching between a landscape mode and a portrait mode, a pedometer, or another application.

The distance sensor 1580F is configured to measure a distance. The electronic device 1500 may measure a distance in an infrared manner or a laser manner. In some embodiments, in a photographing scenario, the electronic device 1500 may measure a distance by using the distance sensor 1580F, to implement quick focusing.

The optical proximity sensor 1580G may include a light-emitting diode (LED) and an optical detector, for example, a photodiode. The light-emitting diode may be an infrared light-emitting diode. The electronic device 1500 emits infrared light by using the light-emitting diode. The electronic device 1500 detects infrared reflected light from a nearby object by using the photodiode. When sufficient reflected light is detected, it may be determined that there is an object near the electronic device 1500. When insufficient reflected light is detected, the electronic device 1500 may determine that there is no object near the electronic device 1500. The electronic device 1500 may detect, by using the optical proximity sensor 1580G, that the user holds the electronic device 1500 close to an ear for a call, to automatically turn off a screen for power saving. The optical proximity sensor 1580G may be also configured to automatically unlock and lock a screen in a smart cover mode or a pocket mode.

The ambient light sensor 1580L is configured to sense ambient light brightness. The electronic device 1500 may adaptively adjust brightness of the display 1594 based on the sensed ambient light brightness. The ambient light sensor 1580L may be also configured to automatically adjust white balance during photographing. The ambient light sensor 1580L may also cooperate with the optical proximity sensor 1580G to detect whether the electronic device 1500 is in a pocket, to avoid an accidental touch.

The fingerprint sensor 1580H is configured to capture a fingerprint. The electronic device 1500 may use a feature of the collected fingerprint to implement fingerprint-based unlocking, application lock access, fingerprint-based photographing, fingerprint-based call answering, and the like.

The temperature sensor 1580J is configured to detect a temperature. In some embodiments, the electronic device 1500 executes a temperature processing policy based on the temperature detected by the temperature sensor 1580J. For example, when the temperature reported by the temperature sensor 1580J exceeds a threshold, the electronic device 1500 lowers performance of a processor close to the temperature sensor 1580J, to reduce power consumption and implement thermal protection. In some other embodiments, when the temperature is less than another threshold, the electronic device 1500 heats the battery 1542 to prevent the electronic device 1500 from being shut down abnormally due to a low temperature. In some other embodiments, when the temperature is less than still another threshold, the electronic device 1500 boosts an output voltage of the battery 1542 to avoid abnormal shutdown due to a low temperature.

The touch sensor 1580K is also referred to as a "touch panel". The touch sensor 1580K may be disposed on the display 1594, and the touch sensor 1580K and the display 1594 form a touchscreen, which is also referred to as a "touch screen". The touch sensor 1580K is configured to detect a touch operation performed on or near the touch sensor 1580K. The touch sensor may transfer the detected touch operation to the application processor, to determine a type of a touch event. A visual output related to the touch operation may be provided through the display 1594. In some other embodiments, the touch sensor 1580K may be alternatively disposed on a surface of the electronic device 1500 at a position different from that of the display 1594.

The bone conduction sensor 1580M may obtain a vibration signal. In some embodiments, the bone conduction sensor 1580M may obtain a vibration signal of a vibration bone of a human vocal part. The bone conduction sensor 1580M may be also in contact with a human pulse to receive a blood pressure beating signal. In some embodiments, the bone conduction sensor 1580M may be alternatively disposed in a headset to form a bone conduction headset. The audio module 1570 may obtain a speech signal through parsing based on the vibration signal that is of the vibration bone of the vocal part and that is obtained by the bone conduction sensor 1580M, to implement a speech function. The application processor may parse heart rate information based on the blood pressure beating signal obtained by the bone conduction sensor 1580M, to implement a heart rate detection function.

The button 1590 includes a power button, a volume button, and the like. The button 1590 may be a mechanical button, or a touch button. The electronic device 1500 may receive a button input, and generate a button signal input related to user settings and function control of the electronic device 1500.

The motor 1591 may generate a vibration prompt. The motor 1591 may be configured to produce an incoming call vibration prompt and a touch vibration feedback. For example, touch operations performed on different applications (for example, a photographing application and an audio playing application) may correspond to different vibration feedback effects. The motor 1591 may also correspond to different vibration feedback effects for touch operations performed on different areas of the display 1594. Different application scenarios (for example, time reminding, information receiving, an alarm clock, and a game) may also correspond to different vibration feedback effects. A touch vibration feedback effect may be further customized.

The indicator 1592 may be an indicator light, and may be configured to indicate a charging status and a power change, or may be configured to indicate a message, a missed call, a notification, and the like.

The SIM card interface 1595 is configured to connect to a SIM card. The SIM card may be inserted into the SIM card interface 1595 or removed from the SIM card interface 1595, to implement contact with or separation from the electronic device 1500. The electronic device 1500 may support 15 or N SIM card interfaces, where N is a positive integer greater than 15. The SIM card interface 1595 may support a nano-SIM card, a micro-SIM card, a SIM card, and the like. A plurality of cards may be inserted into a same SIM card interface 1595 at the same time. The plurality of cards may be of a same type or may different types. The SIM card interface 1595 may be compatible with different types of SIM cards. The SIM card interface 1595 may be further compatible with an external memory card. The electronic device 1500 interacts with a network by using the SIM card, to implement functions such as calling and data communication. In some embodiments, the electronic device 1500 uses an eSIM, namely, an embedded SIM card. The eSIM card may be embedded into the electronic device 1500, and cannot be separated from the electronic device 1500.

All or some of the methods in embodiments of this application may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of procedures or functions according to embodiments of the present invention are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium, for example, a floppy disk, a hard disk, or a magnetic tape, or may be an optical medium, for example, a digital video disc (digital video disc, DVD), or may be a semiconductor medium, for example, an SSD.

It is clear that a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A method, comprising:
   receiving, by a first terminal device, downlink control information (DCI) from a network device, wherein the DCI comprises time domain resource information and frequency domain resource information, wherein the time domain resource information comprises time domain offset information, time domain start position information, and duration information, and the time domain resource information is used to determine a first time domain resource on which a first data channel is located, wherein the frequency domain resource information is used to determine frequency domain resources, the frequency domain resources comprise a first frequency domain resource on which the first data channel is located and a second frequency domain resource on which a second data channel is located, and the second data channel is located on a second time domain resource that is different from the first time domain resource on which the first data channel is located; and
   receiving, by the first terminal device on the first time domain resource and the first frequency domain resource, a signal that is located on the first data channel and that is sent from the network device, and wherein the first data channel is used by the first terminal device to communicate with the network device, and the second data channel is used by a second terminal device to communicate with the network device.

2. The method according to claim 1, wherein the time domain offset information is used to determine a time domain interval between a second time unit in which the DCI is located and a first time unit in which the first data channel is located, wherein the time domain start position information is used to determine a first position, and the first position is a time domain start position of the first data channel in the first time unit, and wherein the duration information is used to determine a first duration, and the first duration is a duration occupied by the first data channel in the first time unit.

3. The method according to claim 2, wherein the first position is further a time domain start position of the second data channel in a third time unit, the third time unit is a time unit in which the second data channel is located, and the first duration is further a duration occupied by the second data channel in the third time unit.

4. The method according to claim 2, wherein at least one of the following is located in a reserved domain of the DCI:
   the time domain offset information, the time domain start position information, the duration information, bandwidth part (BWP) information, or confirmation information; and
   wherein the confirmation information is used to determine that the second data channel is located on the second time domain resource that is different from the first time domain resource on which the first data channel is located, and the BWP information is used to determine a first BWP on which the first data channel is located.

5. The method according to claim 1, wherein the first data channel is located in a first bandwidth part (BWP), the DCI and the second data channel are located in a second BWP, the DCI further comprises BWP information, and the BWP information is used to determine the first BWP; and wherein the method further comprises:
receiving, by the first terminal device on the first BWP, the signal that is located on the first data channel and that is from the network device.

6. The method according to claim 5, wherein the BWP information comprises BWP offset information, or BWP offset information and first BWP bandwidth information, or first BWP start position information and first BWP bandwidth information; and
wherein the BWP offset information is used to determine a frequency domain interval between the second BWP and the first BWP, the first BWP bandwidth information is used to determine a bandwidth occupied by the first BWP, and the first BWP start position information is used to determine a frequency domain start position of the first BWP.

7. The method according to claim 1, wherein the time domain resource information corresponds to zero (0) bits, and the first time domain resource is predefined.

8. The method according to claim 1, wherein the first terminal device and the second terminal device are different types of terminal devices.

9. The method according to claim 1, wherein the signal on the first data channel comprises a system message.

10. The method according to claim 1, wherein the DCI further comprises confirmation information, and the confirmation information is used to determine that the second data channel is located on the second time domain resource that is different from the first time domain resource on which the first data channel is located.

11. A first terminal device, comprising:
at least one processor; and
a memory coupled to the at least one processor, the memory comprising instructions that, when executed by the at least one processor, cause the first terminal device to perform operations comprising:
receiving downlink control information (DCI) from a network device, wherein the DCI comprises time domain resource information and frequency domain resource information, wherein the time domain resource information comprises time domain offset information, time domain start position information, and duration information, and the time domain resource information is used to determine a first time domain resource on which a first data channel is located, wherein the frequency domain resource information is used to determine frequency domain resources, the frequency domain resources comprise a first frequency domain resource on which the first data channel is located and a second frequency domain resource on which a second data channel is located, and the second data channel is located on a second time domain resource that is different from the first time domain resource on which the first data channel is located; and
receiving, on the first time domain resource and the first frequency domain resource, a signal that is located on the first data channel and that is from the network device, wherein the first data channel is used by the first terminal device to communicate with the network device, and the second data channel is used by a second terminal device to communicate with the network device.

12. The first terminal device according to claim 11, wherein the time domain offset information is used to determine a time domain interval between a second time unit in which the DCI is located and a first time unit in which the first data channel is located, wherein the time domain start position information is used to determine a first position, and the first position is a time domain start position of the first data channel in the first time unit, and wherein the duration information is used to determine a first duration, and the first duration is a duration occupied by the first data channel in the first time unit.

13. The first terminal device according to claim 12, wherein the first position is further a time domain start position of the second data channel in a third time unit in which the second data channel is located, and the first duration is further a duration occupied by the second data channel in the third time unit.

14. The first terminal device according to claim 11, wherein the first data channel is located in a first bandwidth part (BWP), the DCI and the second data channel are located in a second BWP, the DCI further comprises BWP information, and the BWP information is used to determine the first BWP; and
wherein the operations comprise:
receiving, on the determined first BWP, the signal that is located on the first data channel and that is from the network device.

15. The first terminal device according to claim 14, wherein the BWP information comprises BWP offset information, or BWP offset information and first BWP bandwidth information, or first BWP start position information and first BWP bandwidth information; and
wherein the BWP offset information is used to determine a frequency domain interval between the second BWP and the first BWP, the first BWP bandwidth information is used to determine a bandwidth occupied by the first BWP, and the first BWP start position information is used to determine a frequency domain start position of the first BWP.

16. A network device, comprising:
at least one processor; and
a memory coupled to the at least one processor, the memory comprising instructions that, when executed by the processor, cause the network device to perform operations comprising:
sending downlink control information (DCI) to a first terminal device, wherein the DCI comprises time domain resource information and frequency domain resource information, wherein the time domain resource information comprises time domain offset information, time domain start position information, and duration information, and the time domain resource information is used to determine a first time domain resource on which a first data channel is located, wherein the frequency domain resource information is used to determine frequency domain resources, the frequency domain resources comprise a first frequency domain resource on which the first data channel is located and a second frequency domain resource on which a second data channel is located, and the second data channel is located on a second time domain resource that is different from the first time domain resource on which the first data channel is located; and
sending, on the first time domain resource and the first frequency domain resource, a signal located on the first data channel to the first terminal device, wherein the first data channel is used by the network device to communicate with the first terminal device, and the second data channel is used by the network device to communicate with a second terminal device.

17. The network device according to claim 16, wherein the time domain offset information is used to determine a time domain interval between a second time unit in which the DCI is located and a first time unit in which the first data channel is located, wherein the time domain start position information is used to determine a first position, and the first position is a time domain start position of the first data channel in the first time unit; and wherein the duration information is used to determine a first duration, and the first duration is a duration occupied by the first data channel in the first time unit.

18. The network device according to claim 17, wherein the first position is further a time domain start position of the second data channel in a third time unit in which the second data channel is located, and the first duration is further a duration occupied by the second data channel in the third time unit.

19. The network device according to claim 16, wherein the first data channel is located in a first bandwidth part (BWP), the DCI and the second data channel are located in a second BWP, the DCI further comprises BWP information, and the BWP information is used to determine the first BWP; and wherein the operations further comprises:
sending, on the first BWP, the signal located on the first data channel to the first terminal device.

20. The network device according to claim 19, wherein the BWP information comprises BWP offset information, or BWP offset information and first BWP bandwidth information, or first BWP start position information and first BWP bandwidth information; and wherein the BWP offset information is used to determine a frequency domain interval between the second BWP and the first BWP, the first BWP bandwidth information is used to determine bandwidth occupied by the first BWP, and the first BWP start position information is used to determine a frequency domain start position of the first BWP.

* * * * *